US011791121B2

(12) United States Patent
Velásquez-García et al.

(10) Patent No.: US 11,791,121 B2
(45) Date of Patent: Oct. 17, 2023

(54) 3D-PRINTED FIELD EMISSION SOURCES FOR COMPACT SYSTEMS

(71) Applicants: Massachusetts Institute of Technology, Cambridge, MA (US); Instituto Tecnológico y de Estudios Superiores de Monterrey, Monterrey (MX)

(72) Inventors: Luis Fernando Velásquez-García, Newton, MA (US); Imperio Perales-Martinez, La Florida (MX)

(73) Assignees: Massachusetts Institute of Technology, Cambridge, MA (US); Instituto Tecnológico y de Estudios Superiores de Monterrey, Monterrey (MX)

(*) Notice: Subject to any disclaimer, the term of this patent is extended or adjusted under 35 U.S.C. 154(b) by 421 days.

(21) Appl. No.: 16/868,000

(22) Filed: May 6, 2020

(65) Prior Publication Data

US 2020/0357595 A1     Nov. 12, 2020

Related U.S. Application Data

(60) Provisional application No. 62/844,652, filed on May 7, 2019.

(51) Int. Cl.
*H01J 1/304* (2006.01)
*H01J 49/08* (2006.01)
(Continued)

(52) U.S. Cl.
CPC .......... *H01J 1/3042* (2013.01); *F03H 1/0025* (2013.01); *H01J 9/025* (2013.01);
(Continued)

(58) Field of Classification Search
None
See application file for complete search history.

(56) References Cited

U.S. PATENT DOCUMENTS

2007/0152563 A1* 7/2007 Cho .................. H01J 63/06
313/495

OTHER PUBLICATIONS

Perales-Martinez et al., Additively Manufactured CNT Field Emission Electron Sources with Integrated In-Plane Gate. IEEE 2018 31$^{st}$ International Vacuum Nanoelectrics Conference, IVNC. Nov. 1, 2018:2 pages.

(Continued)

*Primary Examiner* — Ashok Patel
(74) *Attorney, Agent, or Firm* — Wolf, Greenfield & Sacks, P.C.

(57) ABSTRACT

A field emission electron source and a method of manufacturing the same. A field emission electron source comprises an emitting electrode and an extractor gate electrode. The emitting electrode comprising a plurality of particles with nanosharp protrusions. The extractor gate electrode comprises a metal. The extractor gate electrode is formed in a same plane as the emitting electrode. The extractor gate electrode is formed surrounding the emitting electrode. A method of manufacturing a field emission electron source comprises forming an emitting electrode comprising a plurality of particles with nanosharp protrusions using a direct ink writing (DIW) printer. The method comprises forming an extractor gate electrode comprising a metal using the DIW printer.

13 Claims, 20 Drawing Sheets

(51) Int. Cl.
H01J 35/06 (2006.01)
H01J 9/02 (2006.01)
F03H 1/00 (2006.01)

(52) U.S. Cl.
CPC .......... *H01J 35/064* (2019.05); *H01J 35/065* (2013.01); *H01J 49/08* (2013.01)

(56) References Cited

OTHER PUBLICATIONS

Perales-Martinez et al., Fully 3D-printed carbon nanotube field emission electron sources with in-plane gate electrode. Nanotechnology. Sep. 24, 2019;30(49):495303.

* cited by examiner

3D-PRINTED FIELD EMISSION SOURCES FOR COMPACT SYSTEMS

CROSS-REFERENCE TO RELATED APPLICATIONS

This Application claims the benefit under 35 U.S.C. § 119(e) of U.S. Provisional Patent Application Ser. No. 62/844,652, filed May 7, 2019, and titled "3D-PRINTED FIELD EMISSION SOURCES FOR COMPACT SYSTEMS", which is hereby incorporated herein by reference in its entirety.

BACKGROUND

Field emitters quantum tunnel electrons to vacuum due to the high electrostatic fields ($>3\times10^9$ V·m$^{-1}$) present on their emitting surfaces; such high electric fields can be generated at moderate voltage using nanosharp, high-aspect-ratio tips. Compared to thermionic counterparts, field emission cathodes consume less energy, respond faster, and can operate in poorer vacuum conditions.

SUMMARY

The inventors have recognized and appreciated that because of the aforementioned properties, field emission cathodes are promising electron sources for a number of applications, including flat-panel displays, free-electron laser, nanosatellite electric propulsion, portable mass spectrometry, and handheld X-ray generation. While a variety of materials may be used in the manufacture of a field emission electron source, including Mo, Si, ZnO, and SnO$_2$, the inventors have recognized and appreciated that using particles with nanosharp protrusions have a number of advantages over other materials, including their nanosized tip diameter, high aspect-ratio, high electrical conductivity, excellent mechanical properties, and chemical stability. Examples of particles with nanosharp protrusions include carbon nanotubes (CNTs), zinc oxide nanowires, and silicon nanowires. While the present application focuses on CNTs, it should be understood that any conductive particles with nanosharp protrusions may be used in some embodiments.

Conventional techniques for forming CNT-based devices include laser transfer, screen printing, and plasma-enhanced chemical vapor deposition. The inventors have recognized and appreciated, however, that these conventional manufacturing techniques pose challenges such as cost, processing time, the need for expensive static masks for defining in specific locations the nanostructured material, large gate interception (or the need of advanced assembly methods to attain high transmission), or some combination thereof.

3D printing techniques are maskless, layer-by-layer manufacturing techniques that create solid objects. 3D printing methods are compatible with implementing hierarchical structures with features spanning orders of magnitude in size. Direct ink writing (DIW) is a 3D printing method in which an ink, which may take the form of a paste, is extruded through a small nozzle, while the nozzle is moved across a platform using numerically controlled stages. The inventors have recognized and appreciated that DIW printers offer unique advantages over the other 3D printing methods such as its compatibility with a very wide range of printable feedstock—including active (for example, transducing) materials, and its feasibility to create monolithic, multi-material objects.

Accordingly, some embodiments are directed to a fully additively manufactured field emission electron source. Some embodiments are directed to a device that includes a flat dielectric substrate with two DIW-printed traces: a spiral made of a CNT ink, i.e., emitting electrode, symmetrically surrounded on both sides by a spiral made of Ag nanoparticle ink, i.e., extractor gate electrode.

The inventors have further recognized and appreciated that non-uniformity of the traces in a field emission electron source results in poor performance and potentially malfunction of the device. The poor performance is at least in part caused by variation in the gap between the emitting electrode and the extractor gate electrode acting as a short. The inventors have further recognized and appreciated that conventional techniques for forming electrodes comprising particles with nanosharp protrusions cannot form substantially uniform traces, but DIW printers are capable of printing electrodes with substantially uniform width and a substantially uniform gap between portions of the printed electrodes. Thus, some embodiments are directed to manufacturing field emission electron sources using a DIW printer.

Some embodiments are directed to a formulation of the CNT ink and a method of fabricating the same. Some embodiments are directed to a method of operating a device with narrow, uniform imprints with high electrical conductivity that quantum tunnel electrons when a high enough voltage is biased between the CNT ink imprint and the Ag ink imprint. Unlike conventional emission cathodes that have an out-of-plane gate on top of the field emitters, some embodiments are directed to a device with an in-plane gate placed directly on top of the substrate, side-by-side with the emitting electrode, which reduces the manufacturing complexity of the device and its cost. This is possible due to the DIW printing technique used to manufacture the device.

Some embodiments relate to a field emission electron source. The field emission electron source may include an emitting electrode comprising a plurality of particles with nanosharp protrusions, and an extractor gate electrode comprising metal, the extractor gate formed in a same plane as the emitting electrode and surrounding the emitting electrode.

In some embodiments, the metal includes at least one metal selected from the group consisting of silver, gold, and aluminum. In some embodiments, the metal comprises metal nanoparticles. In some embodiments, the metal comprises silver nanoparticles.

In some embodiments, the plurality of particles with nanosharp protrusions comprise nanotubes and/or nanowires. In some embodiments, the plurality of particles with nanosharp protrusions comprise at least one particle selected from the group consisting of carbon nanotubes, zinc oxide nanowires, and silicon nanowires.

In some embodiments, the emitting electrode is formed using a direct ink writing (DIW) printer. In some embodiments, the extractor gate electrode is formed using a direct ink writing (DIW) printer.

In some embodiments, the emitting electrode is parallel to the extractor gate electrode along at least a portion of the emitting electrode. In some embodiments, the emitting electrode is parallel to the extractor gate electrode along an entire length of the emitting electrode.

In some embodiments, the emitting electrode is equidistant from two different portions of the extractor gate electrode along an entire length of the emitting electrode.

In some embodiments, a distance from the emitting electrode to each of the two different portions of the extractor gate electrode is between 100 nm and 1,000 μm. In some embodiments, a distance from the emitting electrode to each of the two different portions of the extractor gate electrode is between 500 nm and 800 µm. In some embodiments, a distance from the emitting electrode to each of the two different portions of the extractor gate electrode is between 1 µm and 800 µm. In some embodiments, a distance from the emitting electrode to each of the two different portions of the extractor gate electrode is between 100 µm and 600 µm. In some embodiments, a distance from the emitting electrode to each of the two different portions of the extractor gate electrode is between 200 µm and 500 µm. In some embodiments, a distance from the emitting electrode to each of the two different portions of the extractor gate electrode is approximately 500 µm. In some embodiments, a distance from the emitting electrode to each of the two different portions of the extractor gate electrode is approximately 300 µm. In some embodiments, a distance from the emitting electrode to each of the two different portions of the extractor gate electrode is approximately 200 µm.

In some embodiments, the emitting electrode has a first substantially uniform trace width and the extractor gate electrode has a second substantially uniform trace width.

In some embodiments, the first substantially uniform trace width is between 1 µm and 500 µm.

In some embodiments, the first substantially uniform trace width is between 50 µm and 300 µm.

In some embodiments, the first substantially uniform trace width is between 100 µm and 300 µm. In some embodiments, the first substantially uniform trace width is approximately 200 µm.

In some embodiments, the second substantially uniform trace width is between 1 µm and 500 µm. In some embodiments, the second substantially uniform trace width is between 50 µm and 300 µm. In some embodiments, the second substantially uniform trace width is between 100 µm and 300 µm. In some embodiments, the second substantially uniform trace width is approximately 200 µm.

In some embodiments, the emitting electrode has a first average trace height and the extractor gate electrode has a second average trace height.

In some embodiments, the first average trace height is between 100 nm and 50 µm. In some embodiments, the first average trace height is between 1 µm and 10 µm. In some embodiments, the first average trace height is between 3 µm and 8 µm. In some embodiments, the first substantially uniform trace width is approximately 5 µm.

In some embodiments, the second average trace height is between 1 µm and 50 µm. In some embodiments, the second average trace height is between 10 µm and 40 µm. In some embodiments, the second average trace height is between 20 µm and 30 µm. In some embodiments, the second average trace height is approximately 19 µm.

In some embodiments, the emitting electrode has a shape of a first spiral and the extractor gate electrode has the shape of a second spiral, wherein the first and second spiral are interleaved. In some embodiments, the first and second spiral are circular spirals. In some embodiments, the first and second spiral are polygonal spirals. In some embodiments, the first and second spiral are rectangular spirals. In some embodiments, the first and second spiral are an arbitrary shape determined based on a shape of a region the emitting electrode and the extractor gate electrode fill.

In some embodiments, the emitting electrode is continuous with no branching points and the extractor gate electrode is continuous with no branching points.

In some embodiments, the emitting electrode and the extractor gate electrode are interdigitated.

In some embodiments, the field emission electron source further comprises a substrate on which the emitting electrode and the extractor gate electrode are formed. In some embodiments, the substrate comprises at least one material selected from the group consisting of glass, quartz, polymer, silicon oxide, silicon nitride, zirconia, and alumina.

In some embodiments, the emitting electrode is formed using a conductive ink of any of the embodiments described below.

Some embodiments relate to a mass spectroscopy device comprising the field emission electron source. In some embodiments, the mass spectroscopy device is a portable device.

Some embodiments, relate to a x-ray source device comprising the field emission electron source. In some embodiments, the x-ray source device is a handheld device.

Some embodiments relate to a neutralizer for electric space propulsion comprising the field emission electron source.

Some embodiments relate to a method of manufacturing a field emission electron source. In some embodiments, a method of manufacturing a field emission electron source comprises forming, using a direct ink writing (DIW) printer, an emitting electrode comprising a plurality of particles with nanosharp protrusions, and forming, using the DIW printer, an extractor gate electrode comprising a metal.

In some embodiments, the extractor gate electrode is formed in a same plane as the emitting electrode.

In some embodiments, the extractor gate electrode and the emitting electrode are formed on a substrate. In some embodiments, the substrate comprises at least one material selected from the group consisting of glass, quartz, polymer, silicon oxide, silicon nitride, zirconia, and alumina.

In some embodiments, the extractor gate electrode is formed so as to symmetrically surround the emitting electrode.

In some embodiments, the method uses no masks.

In some embodiments, forming the emitting electrode is performed in a first single printing action. In some embodiments, the single printing action comprises maintaining a constant gap between the substrate and a nozzle of the DIW printer. In some embodiments, the single printing action comprises maintaining a substantially constant flow rate of a conductive ink from a nozzle of the DIW printer.

In some embodiments, forming the extractor gate electrode is performed in a second single printing action. In some embodiments, the single printing action comprises maintaining a constant gap between the substrate and a nozzle of the DIW printer. In some embodiments, the single printing action comprises maintaining a substantially constant flow rate of a conductive ink from a nozzle of the DIW printer.

In some embodiments, the method further comprises determining a first topography map of the substrate before forming the emitting electrode. In some embodiments, the method further comprises controlling, while forming the emitting electrode, a distance between the nozzle of the DIW printer and the substrate based on the first topography map.

In some embodiments, the method further comprises determining a second topography map of the substrate after forming the emitting electrode and before forming the extractor gate electrode. In some embodiments, the method further comprises controlling, while forming the extractor gate electrode, a distance between the nozzle of the DIW printer and the substrate based on the second topography map.

In some embodiments, the method further comprising, baking the substrate at a first temperature after forming the emitting electrode on the substrate, wherein the first temperature is at or above a decomposition temperature of a polymeric binder of a conductive ink used to form the emitting electrode and wherein the first temperature is below a decomposition temperature of the plurality of particles with nanosharp protrusions of the conductive ink. In some embodiments, the first temperature is between 200° C. and 600° C. In some embodiments, the first temperature is between 300° C. and 500° C. In some embodiments, the first temperature is approximately equal to 400° C.

In some embodiments, the method further comprises mechanically treating the emitter electrode to release tips of at least a portion of the plurality of particles with nanosharp protrusions after forming the emitter electrode. In some embodiments, mechanically treating the emitter electrode comprises applying tape to the emitter electrode and subsequently removing the tape from the emitter electrode. In some embodiments, the tape is applied using a roller.

In some embodiments, the metal material comprises at least one metal selected from the group consisting of silver, gold, and aluminum. In some embodiments, the metal material comprises metal nanoparticles. In some embodiments, the metal material comprises silver nanoparticles.

In some embodiments, the plurality of particles with nanosharp protrusions comprise nanotubes and/or nanowires. In some embodiments, the plurality of particles with nanosharp protrusions comprise at least one particle selected from the group consisting of carbon nanotubes, zinc oxide nanowires, and silicon nanowires.

In some embodiments, the emitting electrode is formed to be parallel to the extractor gate electrode along at least a portion of the emitting electrode. In some embodiments, the emitting electrode is formed to be parallel to the extractor gate electrode along an entire length of the emitting electrode.

In some embodiments, the emitting electrode is formed to be equidistant from two different portions of the extractor gate electrode along an entire length of the emitting electrode.

In some embodiments, the extractor gate electrode is formed such that a distance from the emitting electrode to each of the two different portions of the extractor gate electrode is between 100 nm and 1,000 µm. In some embodiments, the extractor gate electrode is formed such that a distance from the emitting electrode to each of the two different portions of the extractor gate electrode is between 500 nm and 800 µm. In some embodiments, the extractor gate electrode is formed such that a distance from the emitting electrode to each of the two different portions of the extractor gate electrode is between 1 µm and 800 µm. In some embodiments, the extractor gate electrode is formed such that a distance from the emitting electrode to each of the two different portions of the extractor gate electrode is between 100 µm and 600 µm. In some embodiments, the extractor gate electrode is formed such that a distance from the emitting electrode to each of the two different portions of the extractor gate electrode is between 200 µm and 500 µm. In some embodiments, the extractor gate electrode is formed such that a distance from the emitting electrode to each of the two different portions of the extractor gate electrode is approximately 500 µm. In some embodiments, the extractor gate electrode is formed such that a distance from the emitting electrode to each of the two different portions of the extractor gate electrode is approximately 300 µm. In some embodiments, the extractor gate electrode is formed such that a distance from the emitting electrode to each of the two different portions of the extractor gate electrode is approximately 200 µm.

In some embodiments, the emitting electrode is formed to have a first substantially uniform trace width and the extractor gate electrode is formed to have a second substantially uniform trace width.

In some embodiments, the first substantially uniform trace width is between 1 µm and 500 µm.

In some embodiments, the first substantially uniform trace width is between 50 µm and 300 µm.

In some embodiments, the first substantially uniform trace width is between 150 µm and 300 µm. In some embodiments, the first substantially uniform trace width is approximately 200 µm.

In some embodiments, the second substantially uniform trace width is between 1 µm and 500 µm. In some embodiments, the second substantially uniform trace width is between 50 µm and 300 µm. In some embodiments, the second substantially uniform trace width is between 100 µm and 300 µm. In some embodiments, the second substantially uniform trace width is approximately 200 µm.

In some embodiments, the emitting electrode is formed to have a first average trace height and the extractor gate electrode is formed to have a second average trace height.

In some embodiments, the first average trace height is between 100 nm and 50 µm. In some embodiments, the first average trace height is between 1 µm and 10 µm. In some embodiments, the first average trace height is between 3 µm and 8 µm. In some embodiments, the first substantially uniform trace width is approximately 5 µm.

In some embodiments, the second average trace height is between 100 nm and 50 µm. In some embodiments, the second average trace height is between 10 µm and 40 µm. In some embodiments, the second average trace height is between 20 µm and 30 µm. In some embodiments, the second average trace height is approximately 19 µm.

In some embodiments, the emitting electrode is formed to have a shape of a first spiral and the extractor gate electrode is formed to have a shape of a second spiral, wherein the first and second spiral are interleaved. In some embodiments, the first and second spiral are circular spirals. In some embodiments, the first and second spiral are polygonal spirals. In some embodiments, the first and second spiral are rectangular spirals. In some embodiments, the first and second spiral are an arbitrary shape determined based on a shape of a region the emitting electrode and the extractor gate electrode fill.

In some embodiments, the emitting electrode is continuous with no branching points and the extractor gate electrode is continuous with no branching points.

In some embodiments, the emitting electrode and the extractor gate electrode are formed to be interdigitated.

In some embodiments, the emitting electrode is formed using a conductive ink of any of embodiments described below.

In some embodiments, the method further comprises including the field emission electron source in a mass spectroscopy device. In some embodiments, the mass spectroscopy device is a portable device.

In some embodiments, the method further comprises including the field emission electron source in a x-ray source device. In some embodiments, the x-ray source device is a handheld device.

In some embodiments, the method further comprises including the field emission electron source in a neutralizer for electric space propulsion.

Some embodiments relate to a method of emitting electrons. In some embodiments, a method of emitting electrons comprises providing an emitting electrode connected to a first electrical terminal, the emitting electrode comprising a plurality of particles with nanosharp protrusions, and providing an extractor gate electrode connected to a second terminal, the extractor gate comprising a metal and formed in a same plane as the emitting electrode and surrounding the emitting electrode, and applying a bias voltage between the extractor gate electrode and the emitting electrode via the first and second terminals.

In some embodiments, the method further comprises providing an external anode. In some embodiments, the method further comprises applying an anode voltage to the external anode.

In some embodiments, the bias voltage is between 10 V and 10,000 V. In some embodiments, the bias voltage is between 10 V and 1000 V. In some embodiments, the bias voltage is between 50 V and 400 V. In some embodiments, the bias voltage is between 60 V and 100 V.

In some embodiments, the anode voltage is between 500 V and 150,000 V. In some embodiments, the anode voltage is between 1000 V and 20,000 V. In some embodiments, the anode voltage is between 1200 V and 1500 V.

In some embodiments, the gate voltage is approximately equal to 1300 V.

In some embodiments, the emitted electrons are configured to ionize a sample for use in mass spectroscopy.

In some embodiments, the emitted electrons are configured to emit x-rays for use in material characterization.

In some embodiments, the emitted electrons are configured to neutralized an electric space thruster that ejects a positively-charged beam.

In some embodiments, the metal material comprises at least one metal selected from the group consisting of silver, gold, and aluminum. In some embodiments, the metal material comprises metal nanoparticles. In some embodiments, the metal material comprises silver nanoparticles.

In some embodiments, the plurality of particles with nanosharp protrusions comprise nanotubes and/or nanowires. In some embodiments, the plurality of particles with nanosharp protrusions comprise at least one particle selected from the group consisting of carbon nanotubes, zinc oxide nanowires, and silicon nanowires.

In some embodiments, the emitting electrode is formed using a direct ink writing (DIW) printer.

In some embodiments, the extractor gate electrode is formed using a direct ink writing (DIW) printer.

In some embodiments, the emitting electrode is parallel to the extractor gate electrode along at least a portion of the emitting electrode. In some embodiments, the emitting electrode is parallel to the extractor gate electrode along an entire length of the emitting electrode.

In some embodiments, the emitting electrode is equidistant from two different portions of the extractor gate electrode along an entire length of the emitting electrode.

In some embodiments, a distance from the emitting electrode to each of the two different portions of the extractor gate electrode is between 100 nm and 1,000 $\mu$m. In some embodiments, a distance from the emitting electrode to each of the two different portions of the extractor gate electrode is between 500 nm and 800 $\mu$m. In some embodiments, a distance from the emitting electrode to each of the two different portions of the extractor gate electrode is between 1 $\mu$m and 800 $\mu$m. In some embodiments, a distance from the emitting electrode to each of the two different portions of the extractor gate electrode is between 100 $\mu$m and 600 $\mu$m. In some embodiments, a distance from the emitting electrode to each of the two different portions of the extractor gate electrode is between 200 $\mu$m and 500 $\mu$m. In some embodiments, a distance from the emitting electrode to each of the two different portions of the extractor gate electrode is approximately 500 $\mu$m. In some embodiments, a distance from the emitting electrode to each of the two different portions of the extractor gate electrode is approximately 300 $\mu$m. In some embodiments, a distance from the emitting electrode to each of the two different portions of the extractor gate electrode is approximately 200 $\mu$m.

In some embodiments, the emitting electrode has a first substantially uniform trace width and the extractor gate electrode has a second substantially uniform trace width.

In some embodiments, the first substantially uniform trace width is between 1 $\mu$m and 500 $\mu$m.

In some embodiments, the first substantially uniform trace width is between 50 $\mu$m and 300 $\mu$m.

In some embodiments, the first substantially uniform trace width is between 150 $\mu$m and 300 $\mu$m. In some embodiments, the first substantially uniform trace width is approximately 200 $\mu$m.

In some embodiments, the second substantially uniform trace width is between 1 $\mu$m and 500 $\mu$m. In some embodiments, the second substantially uniform trace width is between 50 $\mu$m and 300 $\mu$m. In some embodiments, the second substantially uniform trace width is between 150 $\mu$m and 300 $\mu$m. In some embodiments, the second substantially uniform trace width is approximately 200 $\mu$m.

In some embodiments, the emitting electrode has a first average trace height and the extractor gate electrode has a second average trace height.

In some embodiments, the first average trace height is between 1 $\mu$m and 50 $\mu$m. In some embodiments, the first average trace height is between 100 nm and 10 $\mu$m. In some embodiments, the first average trace height is between 3 $\mu$m and 8 $\mu$m. In some embodiments, the first substantially uniform trace width is approximately 5 $\mu$m.

In some embodiments, the second average trace height is between 100 nm and 50 $\mu$m. In some embodiments, the second average trace height is between 10 $\mu$m and 40 $\mu$m. In some embodiments, the second average trace height is between 20 $\mu$m and 30 $\mu$m. In some embodiments, the second average trace height is approximately 19 $\mu$m.

In some embodiments, the emitting electrode has a shape of a first spiral and the extractor gate electrode has the shape of a second spiral, wherein the first and second spiral are interleaved. In some embodiments, wherein the first and second spiral are circular spirals. In some embodiments, the first and second spiral are polygonal spirals. In some embodiments, the first and second spiral are rectangular spirals. In some embodiments, the first and second spiral are an arbitrary shape determined based on a shape of a region the emitting electrode and the extractor gate electrode fill.

In some embodiments, the emitting electrode is continuous with no branching points and the extractor gate electrode is continuous with no branching points.

In some embodiments, the emitting electrode and the extractor gate electrode are interdigitated.

Some embodiments relate to a substrate on which the emitting electrode and the extractor gate electrode are formed. In some embodiments, the substrate comprises at least one material selected from the group consisting of glass, quartz, polymer, silicon oxide, silicon nitride, zirconia, and alumina.

In some embodiments, the emitting electrode is formed using a conductive ink of any of the embodiments described below.

Some embodiments relate to a method of manufacturing a conductive ink. In some embodiments, a method of manufacturing a conductive ink comprises adding a plurality of carbon nanotubes (CNTs) to a solvent, and adding a polymeric binder to the plurality of CNTs and the solvent to form the conductive ink.

In some embodiments, the method further comprises, before adding the polymeric binder, dispersing the plurality of CNTs in the solvent using an ultrasonic homogenizer.

In some embodiments, the method further comprises, after adding the polymeric binder, stirring the plurality of CNTs, the solvent and the polymeric binder until the polymeric binder is dissolved in the solvent.

In some embodiments, the method further comprises pouring the conductive ink into a cartridge syringe.

In some embodiments, the method further comprises storing the conductive ink at a temperature between 5° C. and 10° C.

In some embodiments, the solvent comprises N,N-Dimethylformamide (DMF) anhydrous.

In some embodiments, the polymeric binder comprises ethyl cellulose (EC). In some embodiments, the EC is an EC powder.

In some embodiments, the polymeric binder is between 10% and 40% by weight of the conductive ink. In some embodiments, the polymeric binder is between 10% and 30% by weight of the conductive ink. In some embodiments, the polymeric binder is between 15% and 30% by weight of the conductive ink. In some embodiments, the polymeric binder is between 15% and 25% by weight of the conductive ink. In some embodiments, the polymeric binder is between 18% and 23% by weight of the conductive ink. In some embodiments, the polymeric binder is between 20% and 22% by weight of the conductive ink. In some embodiments, is 21% by weight of the conductive ink.

In some embodiments, the plurality of CNTs have a concentration of between 1 mg and 100 mg per mL of solvent in the conductive ink. In some embodiments, the plurality of CNTs have a concentration of between 1 mg and 50 mg per mL of solvent in the conductive ink. In some embodiments, the plurality of CNTs have a concentration of between 2 mg and 50 mg per mL of solvent in the conductive ink. In some embodiments, the plurality of CNTs have a concentration of approximately 2 mg per mL of solvent in the conductive ink. In some embodiments, the plurality of CNTs have a concentration of between 5 mg and 40 mg per mL of solvent in the conductive ink. In some embodiments, the plurality of CNTs have a concentration of between 10 mg and 30 mg per mL of solvent in the conductive ink. In some embodiments, the plurality of CNTs have a concentration of between 15 mg and 25 mg per mL of solvent in the conductive ink. In some embodiments, the plurality of CNTs have a concentration of approximately 20 mg per mL of solvent in the conductive ink.

In some embodiments, the polymeric binder has a viscosity of between 1 cP and 50 cP. In some embodiments, the polymeric binder has a viscosity of between 1 cP and 30 cP. In some embodiments, the polymeric binder has a viscosity of between 5 cP and 25 cP. In some embodiments, the polymeric binder has a viscosity of between 5 cP and 15 cP. In some embodiments, the polymeric binder has a viscosity of approximately 10 cP.

In some embodiments, the plurality of CNTs have an average diameter size between 1 nm and 500 nm. In some embodiments, the plurality of CNTs have an average diameter size between 1 nm and 60 nm. In some embodiments, the plurality of CNTs have an average diameter size between 10 nm and 50 nm. In some embodiments, the plurality of CNTs have an average diameter size between 10 nm and 30 nm. In some embodiments, the plurality of CNTs have an average diameter size between 20 nm and 28 nm. In some embodiments, the plurality of CNTs have an average diameter size of approximately 26 nm.

In some embodiments, each individual CNT of the plurality of CNTs has a diameter size of between 1 and 500 nm. In some embodiments, each individual CNT of the plurality of CNTs has a diameter size of between 5 and 70 nm. In some embodiments, each individual CNT of the plurality of CNTs has a diameter size of between 10 and 60 nm. In some embodiments, each individual CNT of the plurality of CNTs has a diameter size of between 16 and 50 nm.

In some embodiments, each individual CNT of the plurality of CNTs has a length size of between 1 μm and 100 μm. In some embodiments, each individual CNT of the plurality of CNTs has a length size of between 1 μm and 50 μm. In some embodiments, each individual CNT of the plurality of CNTs has a length size of between 10 μm and 35 μm. In some embodiments, In some embodiments, the plurality of CNTs comprise (—COOH) functionalized multiwall CNTs. In some embodiments, the (—COOH) functionalized multiwall CNTs have a purity greater than or equal to 90%. In some embodiments, the (—COOH) functionalized multiwall CNTs have a purity greater than or equal to 95%. In some embodiments, the (—COOH) functionalized multiwall CNTs have a purity greater than or equal to 96%. In some embodiments, the (—COOH) functionalized multiwall CNTs have a purity greater than or equal to 97%.

In some embodiments, the solvent and the polymeric binder are both substantially non-conductive.

In some embodiments, the plurality of CNTs have an average aspect ratio of 10:1, wherein the aspect ratio of each CNT of the plurality of CNTs is defined as a ratio of the length of the CNT to the diameter of the CNT. In some embodiments, the plurality of CNTs have an average aspect ratio of 5:1, wherein the aspect ratio of each CNT of the plurality of CNTs is defined as a ratio of the length of the CNT to the diameter of the CNT.

In some embodiments, the conductive ink has a resistivity between 0.01 Ω·cm and 10.0 Ω·cm. In some embodiments, the conductive ink has a resistivity between 0.3 Ω·cm and 2.0 Ω·cm. In some embodiments, the conductive ink has a resistivity between 0.5 Ω·cm and 1.0 Ω·cm. In some embodiments, the conductive ink has a resistivity of approximately 0.78 Ω·cm.

In some embodiments, the conductive ink has a viscosity of between 150 Pa·s and 0.5 Pa·s. In some embodiments, the conductive ink has a viscosity of between 120 Pa·s and 1.0 Pa·s. In some embodiments, the conductive ink has a viscosity of between 112 Pa·s and 2.0 Pa·s. In some embodiments, the conductive ink has a viscosity of between 100 Pa·s and 5.0 Pa·s.

In some embodiments, a decomposition temperature of the polymeric binder is between 200° C. and 500° C. In some embodiments, a decomposition temperature of the polymeric binder is between 350° C. and 450° C. In some embodiments, a decomposition temperature of the polymeric binder is approximately 400° C.

In some embodiments, a decomposition temperature of the CNTs is between 550° C. and 700° C.

In some embodiments, a decomposition temperature of the CNTs is between 600° C. and 650° C.

In some embodiments, a decomposition temperature of the CNTs is approximately 620° C.

In some embodiments, a decomposition temperature of the CNTs is between 100° C. and 300° C. greater than a decomposition temperature of the polymeric binder. In some embodiments, a decomposition temperature of the CNTs is between 200° C. and 250° C. greater than a decomposition temperature of the polymeric binder. In some embodiments, a decomposition temperature of the CNTs is approximately 220° C. greater than a decomposition temperature of the polymeric binder.

Some embodiments relate to a conductive ink. The conductive ink may include a plurality of carbon nanotubes (CNTs), a solvent, and a polymeric binder.

In some embodiments, the solvent comprises N,N-Dimethylformamide (DMF) anhydrous.

In some embodiments, the polymeric binder comprises ethyl cellulose (EC). In some embodiments, the EC is an EC powder.

In some embodiments, the polymeric binder is between 10% and 40% by weight of the conductive ink. In some embodiments, the polymeric binder is between 10% and 30% by weight of the conductive ink. In some embodiments, the polymeric binder is between 15% and 30% by weight of the conductive ink. In some embodiments, the polymeric binder is between 15% and 25% by weight of the conductive ink. In some embodiments, the polymeric binder is between 18% and 23% by weight of the conductive ink. In some embodiments, the polymeric binder is between 20% and 22% by weight of the conductive ink. In some embodiments, the polymeric binder is 21% by weight of the conductive ink.

In some embodiments, the plurality of CNTs have a concentration of between 1 mg and 100 mg per mL of solvent in the conductive ink. In some embodiments, the plurality of CNTs have a concentration of between 1 mg and 50 mg per mL of solvent in the conductive ink. In some embodiments, the plurality of CNTs have a concentration of between 2 mg and 50 mg per mL of solvent in the conductive ink. In some embodiments, the plurality of CNTs have a concentration of approximately 2 mg per mL of solvent in the conductive ink. In some embodiments, the plurality of CNTs have a concentration of between 5 mg and 40 mg per mL of solvent in the conductive ink. In some embodiments, the plurality of CNTs have a concentration of between 10 mg and 30 mg per mL of solvent in the conductive ink. In some embodiments, the plurality of CNTs have a concentration of between 15 mg and 25 mg per mL of solvent in the conductive ink. In some embodiments, the plurality of CNTs have a concentration of approximately 20 mg per mL of solvent in the conductive ink.

In some embodiments, the polymeric binder has a viscosity of between 1 cP and 50 cP. In some embodiments, the polymeric binder has a viscosity of between 1 cP and 30 cP. In some embodiments, the polymeric binder has a viscosity of between 5 cP and 25 cP. In some embodiments, the polymeric binder has a viscosity of between 5 cP and 15 cP. In some embodiments, the polymeric binder has a viscosity of approximately 10 cP.

In some embodiments, the plurality of CNTs have an average diameter size between 1 nm and 500 nm. In some embodiments, the plurality of CNTs have an average diameter size between 1 nm and 100 nm. In some embodiments, the plurality of CNTs have an average diameter size between 10 nm and 50 nm. In some embodiments, the plurality of CNTs have an average diameter size between 10 nm and 30 nm. In some embodiments, the plurality of CNTs have an average diameter size between 20 nm and 28 nm. In some embodiments, the plurality of CNTs have an average diameter size of approximately 26 nm.

In some embodiments, each individual CNT of the plurality of CNTs has a diameter size of between 1 and 500 nm. In some embodiments, each individual CNT of the plurality of CNTs has a diameter size of between 5 and 70 nm. In some embodiments, each individual CNT of the plurality of CNTs has a diameter size of between 10 and 60 nm. In some embodiments, each individual CNT of the plurality of CNTs has a diameter size of between 16 and 50 nm.

In some embodiments, each individual CNT of the plurality of CNTs has a length size of between 1 μm and 100 μm. In some embodiments, each individual CNT of the plurality of CNTs has a length size of between 1 μm and 50 μm. In some embodiments, each individual CNT of the plurality of CNTs has a length size of between 10 μm and 35 μm.

In some embodiments, the plurality of CNTs comprise (—COOH) functionalized multiwall CNTs. In some embodiments, the (—COOH) functionalized multiwall CNTs have a purity greater than or equal to 90%. In some embodiments, the (—COOH) functionalized multiwall CNTs have a purity greater than or equal to 95%. In some embodiments, the (—COOH) functionalized multiwall CNTs have a purity greater than or equal to 96%. In some embodiments, the (—COOH) functionalized multiwall CNTs have a purity greater than or equal to 97%.

In some embodiments, the solvent and the polymeric binder are both substantially non-conductive.

In some embodiments, the plurality of CNTs have an average aspect ratio of 10:1, wherein the aspect ratio of each CNT of the plurality of CNTs is defined as a ratio of the length of the CNT to the diameter of the CNT. In some embodiments, the plurality of CNTs have an average aspect ratio of 5:1, wherein the aspect ratio of each CNT of the plurality of CNTs is defined as a ratio of the length of the CNT to the diameter of the CNT.

In some embodiments, the conductive ink has a resistivity between 0.01 Ω·cm and 10.0 Ω·cm. In some embodiments, the conductive ink has a resistivity between 0.3 Ω·cm and 2.0 Ω·cm. In some embodiments, the conductive ink has a resistivity between 0.5 Ω·cm and 1.0 Ω·cm. In some embodiments, the conductive ink has a resistivity of approximately 0.77 Ω·cm.

In some embodiments, the conductive ink has a viscosity of between 150 Pa·s and 0.5 Pa·s. In some embodiments, the conductive ink has a viscosity of between 120 Pa·s and 1.0 Pa·s. In some embodiments, the conductive ink has a viscosity of between 112 Pa·s and 2.0 Pa·s. In some embodiments, the conductive ink has a viscosity of between 100 Pa·s and 5.0 Pa·s.

In some embodiments, a decomposition temperature of the polymeric binder is between 200° C. and 500° C. In some embodiments, a decomposition temperature of the polymeric binder is between 350° C. and 450° C. In some embodiments, a decomposition temperature of the polymeric binder is approximately 400° C.

In some embodiments, a decomposition temperature of the CNTs is between 550° C. and 700° C.

In some embodiments, a decomposition temperature of the CNTs is between 600° C. and 650° C.

In some embodiments, a decomposition temperature of the CNTs is approximately 620° C.

In some embodiments, a decomposition temperature of the CNTs is between 100° C. and 300° C. greater than a decomposition temperature of the polymeric binder. In some embodiments, a decomposition temperature of the CNTs is between 200° C. and 250° C. greater than a decomposition temperature of the polymeric binder. In some embodiments, a decomposition temperature of the CNTs is approximately 220° C. greater than a decomposition temperature of the polymeric binder.

DETAILED DESCRIPTION

Figure 1:
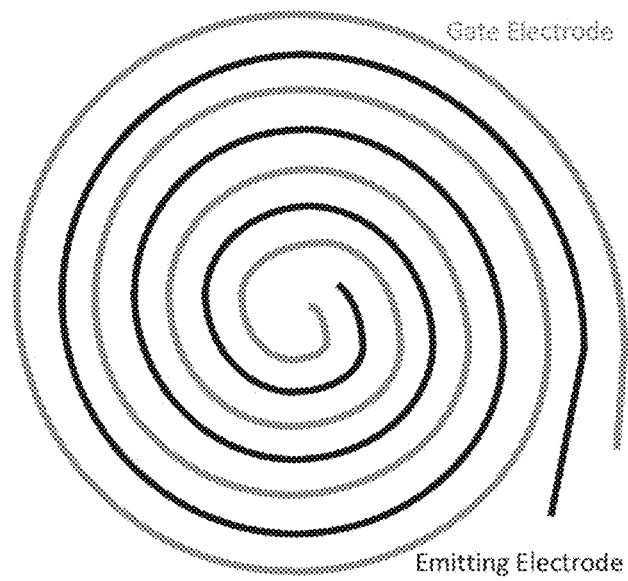
FIG. 1 is a schematic representation of a 3D printed field emission source with finely varying spiral, according to some embodiments.

Some aspects of the present disclosure relate to a fully additively manufactured carbon nanotube (CNT) field emission electron sources with integrated in-plane gate electrode. The devices may be created via direct ink writing (DIW), which is an inexpensive and versatile additive manufacturing technique, and also one of the few 3D printing methods capable of monolithic multi-material printing. As described in more detail below, in one example, an emission device manufactured using the techniques described herein comprises a 2.5 cm by 2.5 cm glass substrate coated with two imprints, a spiral made of a CNT ink (the emitting electrode), symmetrically surrounded on both sides by a spiral made of Ag nanoparticle ink (the in-plane extractor gate).

Some aspects of the present disclosure relate to a CNT ink. As described in more detail below, in one example, the CNT ink may comprise a mixture of (—COOH)-functionalized multiwalled CNTs (MWCNTs), N,N-Dimethylformamide (DMF), and ethyl cellulose (EC). Formulation of the CNT ink may result in a CNT concentration equal to 20 mg·ml$^{-1}$ and in imprints with an electrical resistivity equal to 0.78 Ω·cm.

A 3D-printed device composed of imprints with length of the CNT trace equal to 25 mm (single, straight trace) and 132 mm (square loops with 400 mm gap between adjacent imprints) in a triode configuration (for example, using an external anode electrode) at ~2.5×10−7 Torr, may yield emission currents as large as 120 mA (60 mA/cm$^2$), start-up voltages as low as 62 V and gate transmission as high as 99%. The low-cost cold cathode technology may be compatible with applications such as compact mass spectrometry and handheld X-ray generation.

Devices fabricated in accordance with the techniques and materials described herein may have a lower cost compared to conventionally manufactured devices. 3D printing techniques are capable of creating low-to-mid volume batches, complex parts, and customized parts at a fraction of the cost of conventional manufacturing, with significant waste reduction. For example, the cost in materials of the CNT ink may be estimated at US $1.47/ml, while the cost of the commercial Ag ink may be US $55/ml, and the cost of each glass substrate may be US $0.14; therefore, for an exemplary square-loop device described herein, the amount of CNT ink used may cost ~US $0.12, while the amount of Ag ink used may cost ~US $2.20, which may result in a total cost in materials below US $2.50 per device. This cost compares favourably to the cost associated with conventional screen printing and semiconductor cleanroom manufacturing.

Some aspects of the present disclosure relate to device design. In some embodiments at least a portion of a device including a cathode is fabricated using additive manufacturing (e.g., 3D printing). A 3D-printed cathode may comprise a flat dielectric substrate with two electrically conductive imprints. For example, a first imprint may be made of CNT ink. The first imprint may form an emitting electrode. The first imprint may be symmetrically surrounded on both sides by a second imprint. The second imprint may be made of a conductive material, for example, a metal. The second imprint may be made of an Ag ink. The second imprint may form an in-plane extractor gate. In some embodiments, the use of an in-plane gate facilitates the transmission of the current emitted by the CNT imprint. The gate electrode may be printed in a material that is conductive, which may minimize voltage drop due to current interception. The emitting electrode may have a nanostructure that can field emit when a large enough bias voltage is applied. Thus, in some embodiments, the conductivity of the gate electrode is much greater than the conductivity of the emitting electrode, for example, by a factor of 100, 1,000, 10,000, or more.

Portions of the devices may be additively manufactured, for example, by a 3D printer. In some embodiments, the devices are manufactured on a substrate. In some embodiments, a 3D printer, such as a direct ink writing (DIW) printer, maintains a nozzle a particular distance above a top surface of a substrate. The DIW printer may control the flow of ink with a piston or a pressure signal and may control the movement of the nozzle across the substrate. The inventors have recognized and appreciated that this way of dispensing the ink can cause pooling of the printable material and such pooling in the traces of the device can cause malfunctioning behaviour. For example, the inventors have recognized and appreciated that pooling may occur when a nozzle retracts. Accordingly, in some embodiments, a layout of a 3D-printed field emission electron source may be configured to reduce or minimize variations in ink flow to facilitate defining arbitrarily long imprints of substantially uniform width, and by extension, with a substantially uniform gap between adjacent imprints. In some embodiments, for a field emission source with integrated in-plane gate, imprints of substantially uniform width, with a substantially uniform gap between imprints can be achieved if the layouts of the imprints are either polygonal, for example, square, spirals or continuous, long, smoothly varying spirals, such as the interleaved spirals illustrated in FIG. 1, so that the only points at which the flow of ink significantly vary are the ends of the imprints. In some embodiments, an example of which is shown in FIG. 1, the emitting electrode and gate electrode may be parallel to one another along at least a portion of the emitting electrode, including the entire length of the emitting electrode but for the portion where the emitting electrode connects to a terminal. Both the emitting electrode and the extractor gate electrode may be continuous without any branching points. In some embodiments, a single emitter feed trace may feed multiple emitting electrodes and a single gate feed trace may feed multiple extractor gate electrodes such that there are branch points in the feed traces that feed an array of electrodes.

The printed electrodes can be pre-screened for electrical conductivity and continuity before field emission characterization in vacuum. Pre-screening for electrical conductivity and continuity can be challenging using the commonly screen-printed design of interdigitated fingers. The orientation of spirals can be adjusted to fully cover a given active area, for example, by following the perimeter of the area, spiralling into smaller loops until the area is covered. The external end of the emitting electrode may have a pad covered with Al ink to minimize contact resistance and facilitate the activation of the device.

Imprint width may be limited by the ink and the resolution capability of the DIW printer. The spacing between adjacent imprints, in some embodiments, is at least an order of magnitude larger than the alignment capability of the DIW printer to be able to define, to a first order, a constant gap between adjacent traces. The imprints may be relatively narrow and tightly spaced to reduce the bias voltage required to field emit electrons, to increase the number of emission sites per unit of area, and to be compatible with a wider range of shapes and sizes of active area.

Some aspects of the present disclosure relate to device fabrication. In some embodiments, field electron emission sources are created with a printed circuit board (PCB) printer (for example, the Voltera V-one printer (Kitchener ON, Canada)). PCB printers may include a heated platform, a computer-controlled positioning system, and a piston that squeezes an ink cartridge that is magnetically attached as shown, for example, in FIG. 2A; the displacement of the piston may be electrically controlled with a motor. The printer can create multiple layouts using a different ink for each layout, and align the layouts within ~25 μm with respect to previously printed layouts. In some embodiments, before each different ink is used, a calibration process is performed to determine a set of parameters (for example, dispense height, piston feed rate, trim length), that generates traces of the desired substantially uniform width and height.

Figure 13:
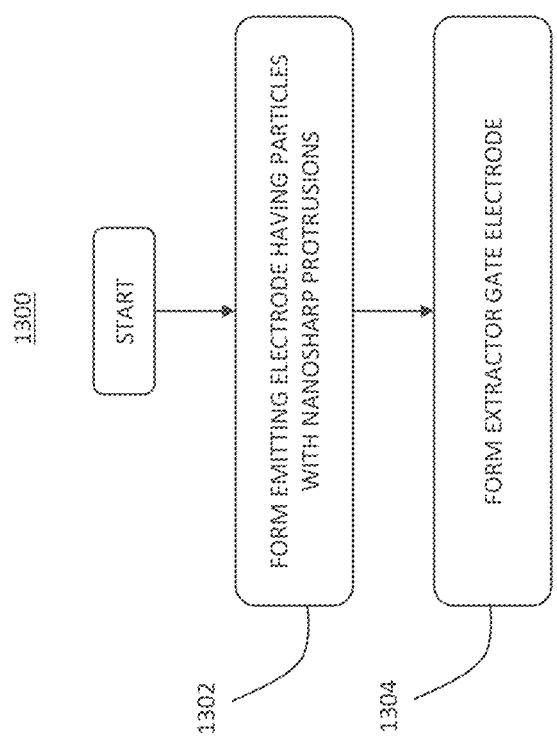
FIG. 13 illustrates an exemplary process for manufacturing a field emission electron source.

FIG. 13 illustrates an exemplary process 1300 for manufacturing a field emission electron source in accordance with some embodiments. In act 1302, an emitting electrode comprising a plurality of particles with nanosharp protrusions is formed using a DIW printer. In act 1304, an extractor gate electrode comprising a metal is formed using the DIW printer.

Figure 14:
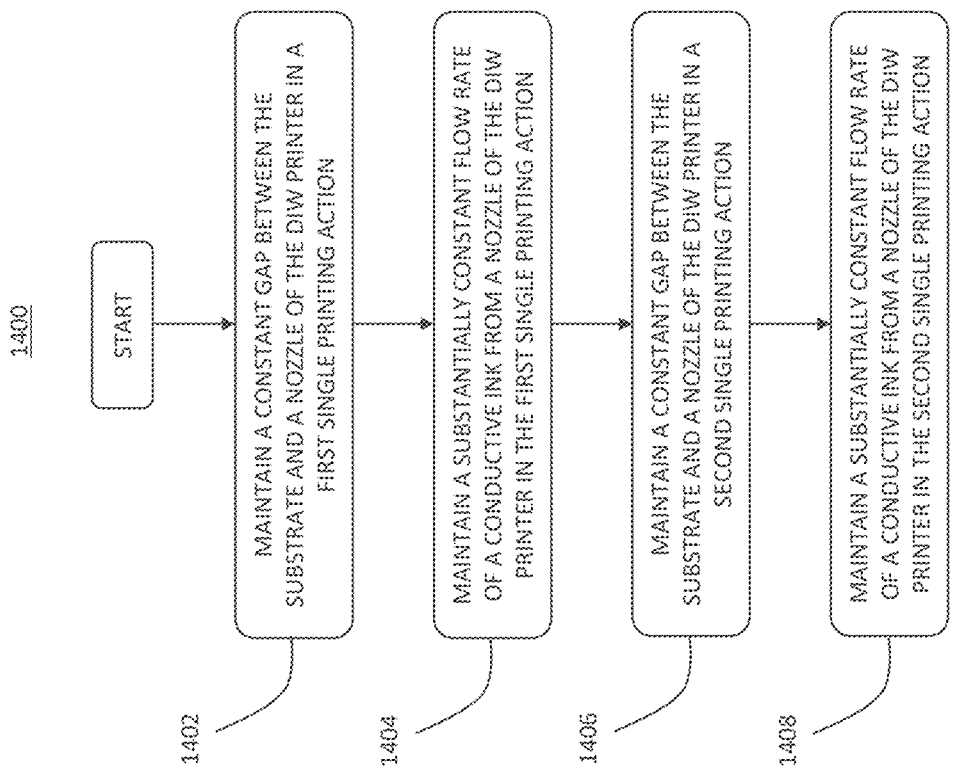
FIG. 14 illustrates an exemplary process for forming an emitting electrode on a substrate in a first single printing action and for forming an extractor gate electrode on a substrate in a second single printing action.

In some embodiments, each of the emitting electrode and the extractor gate electrode may be formed in a single printing action. FIG. 14 illustrates an exemplary process 1400 for forming an emitting electrode on a substrate in a first single printing action and for forming an extractor gate electrode on the substrate in a second single printing action. In act 1402, a constant gap between the substrate and a nozzle of the DIW printer is maintained in a first single printing action. In act 1404, a substantially constant flow rate of a conductive ink from a nozzle of the DIW printer is maintained in the first single printing action. In act 1406, a constant gap between the substrate and a nozzle of the DIW printer is maintained in a second single printing action. In act 1408, a substantially constant flow rate of a conductive ink from a nozzle of the DIW printer is maintained in the second single printing action. In some embodiments, the emitting electrode is formed on the substrate in the first single printing action. In some embodiments, the extractor gate electrode is formed on the substrate in the second single printing action. In other embodiments, the order in which the electrodes are formed may be reversed. In some embodiments, constant flow rate of ink may be maintained by selecting an ink based on particular parameters (for example, viscosity), controlling the displacement of the piston (for example, electrically controlling the piston with a motor), using a pressure signal of the printer, printing ink in a particular layout (for example, in a continuous, long imprint), or selecting a particular nozzle diameter.

Figure 15:
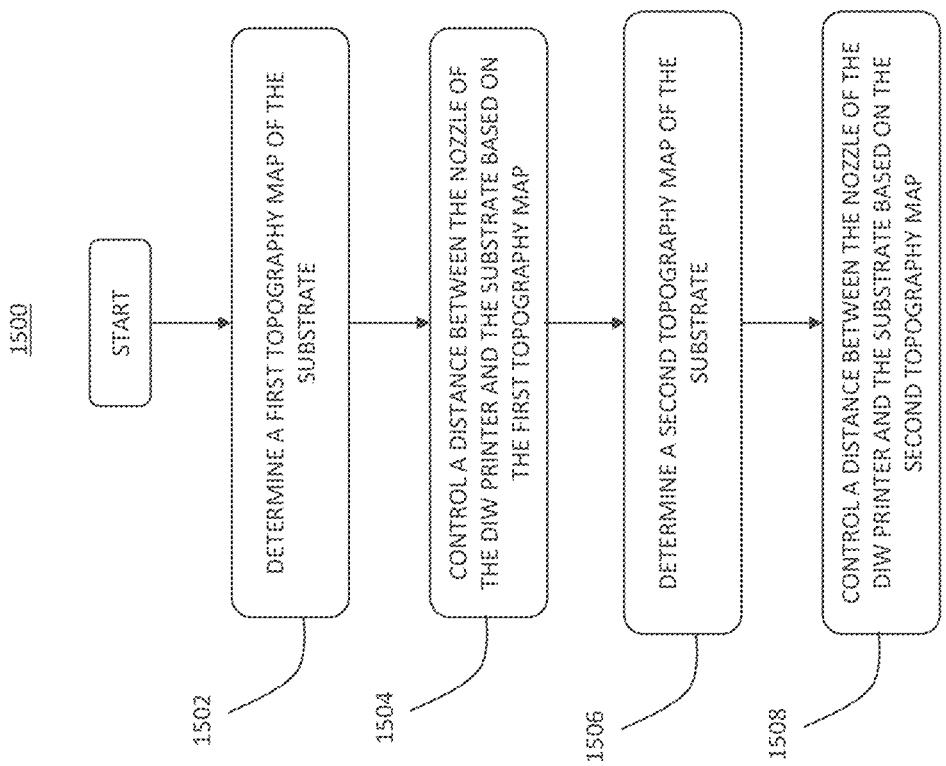
FIG. 15 illustrates an exemplary process for forming an emitting electrode and forming an extractor gate electrode.

FIG. 15 illustrates an exemplary process 1500 for forming an emitting electrode and an extractor gate electrode in accordance with some embodiments. In act 1502, a first topography map of the substrate is determined. In act 1504, a distance between the nozzle of the DIW printer and the substrate based on the first topography map is controlled while forming the emitting electrode. In act 1506, a second topography map of the substrate is determined. In act 1508, a distance between the nozzle of the DIW printer and the substrate based on the second topography map is controlled while forming the extractor gate electrode.

Figures 2A, 2B, 2C:
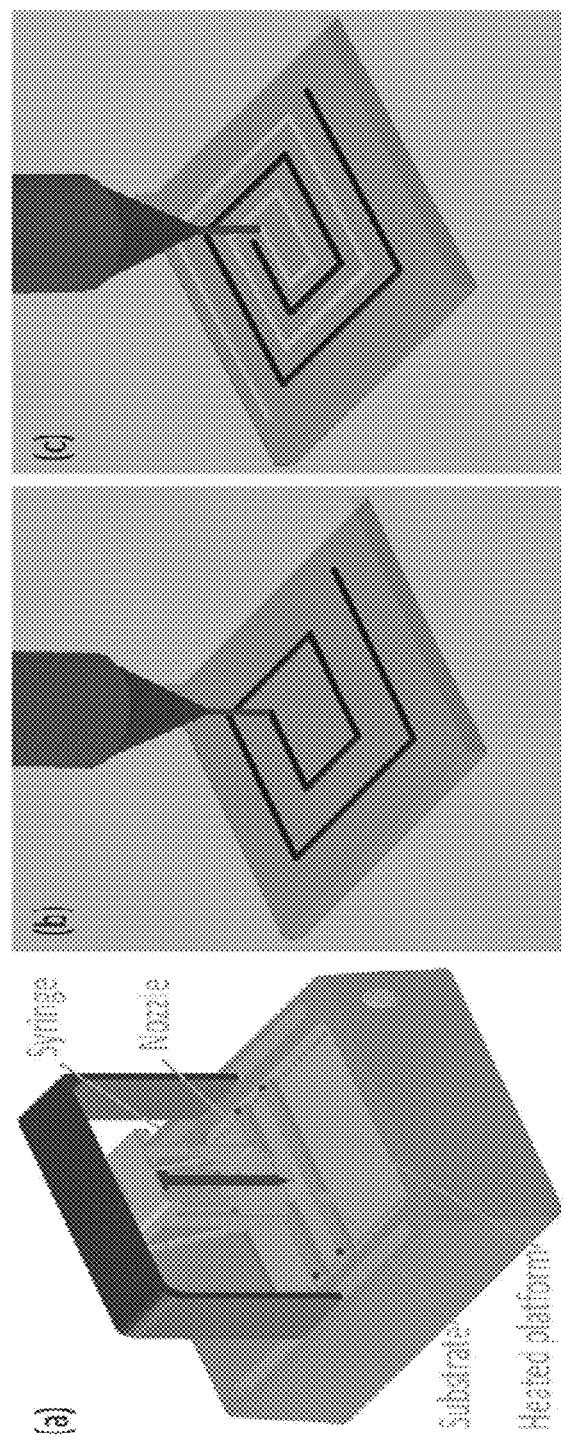
FIG. 2A is a 3D schematic of the V-one PCB printer, according to some embodiments.
FIG. 2B illustrates the creation of CNT imprint using the printer of FIG. 2A, according to some embodiments.
FIG. 2C illustrates the creation of Ag imprint using the printer of FIG. 2A, according to some embodiments.

In some embodiments, a printer, such as a DIW printer, may scan an upper surface of a substrate and create a map, for example, a topography map, of the surface. The map may be used by the printer during printing. For example, the map may be used to make sure that the separation between a nozzle of the printer and an upper surface of the substrate is constant. In some embodiments, the computer-controlled positioning system of the printer uses the map to maintain a constant separation between the nozzle of the printer and the upper surface of the substrate. After each scan, the emitting electrode and/or the extractor gate electrode may be printed using a layout, for example, a layout file in Gerber format (FIG. 2B).

In one example, a CNT field emission electron source is printed on a 25 mm by 25 mm, clean, flat glass substrate placed over a platform of the printer, the glass substrate being fixed with clamps to avoid movement during printing. Although a glass substrate is described in the present disclosure, other substrate materials may alternatively be used. For example, the substrate may be formed from other materials such as silicon nitride, alumina, silica, zirconia, quartz, or polymers.

The substrate may be transferred into an oven, such as a tube furnace, to remove the organic binder and solvent (400° C., 1 hr, argon atmosphere). In some embodiments, the substrate may be dried in a nitrogen box prior to being transferred into the oven.

Figure 16:
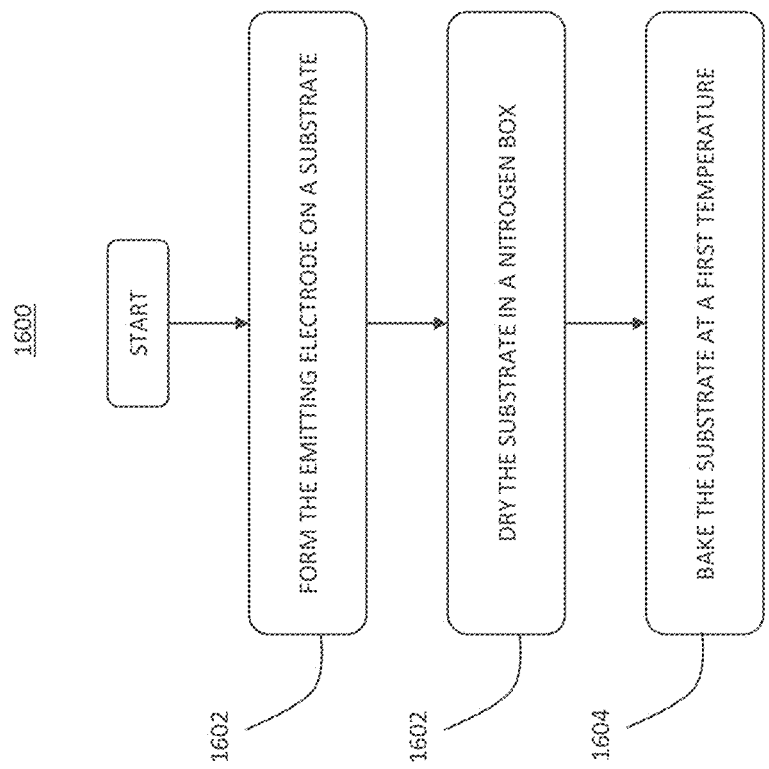
FIG. 16 illustrates an exemplary process for manufacturing an emitting electrode.

FIG. 16 illustrates an exemplary process 1600 for manufacturing an emitting electrode in accordance with some embodiments. In act 1602, the emitting electrode is formed on the substrate. In act 1604, the substrate is dried in a nitrogen box. In act 1606, the substrate is baked at a first temperature.

A mechanical treatment may be performed on the imprint to release CNT tips from its surface. In some embodiments, the mechanical treatment is performed using pressure, no-residue sticky tape applied to the top of the CNT imprint. After waiting for a few minutes, the tape may be pulled, removing material from the top of the imprint while releasing some CNTs from the bulk. This procedure may remove a very small amount of material. The inventors have recognized and appreciated that (1) inspection of imprints using confocal microscopy before/after the tape treatment reveals little or no noticeable difference, (2) no fissures in the CNT imprints after administering the tape treatment are observed, and (3) CNT imprints made of the same ink formulation consistently show the same electrical conductivity.

Figure 17:
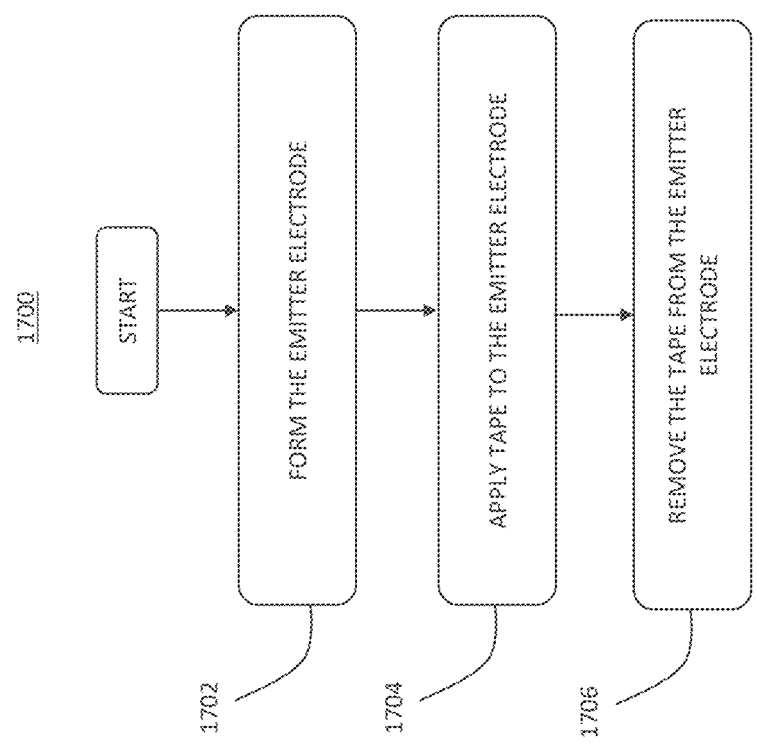
FIG. 17 illustrates an exemplary process for mechanically treating an emitter electrode to release tips of at least a portion of the plurality of particles with nanosharp protrusions.

FIG. 17 illustrates an exemplary process 1700 for mechanically treating an emitter electrode to release tips of at least a portion of the plurality of particles with nanosharp protrusions. In act 1702, the emitter electrode is formed. In act 1704, tape is applied to the emitter electrode. In act 1706, the tape is removed from the emitter electrode.

The gate electrode may be printed using, for example, a Gerber file as layout (FIG. 2C). The new layout may be aligned to the previously printed emitting electrode layout. The substrate may be baked, for example, at 160° C. for 35 min, using the platform of the printer to dry the silver ink imprint and improve its electrical properties. In some embodiments, nozzles with internal diameters equal to 100 µm and 225 µm may be used to print the silver ink and CNT ink, respectively. The nozzles may be referred to, in some instances, as a pen.

Morphology of the emitting surface of Ag and CNT imprints according to some embodiments was characterized using a Zeiss Merlin High-resolution SEM (Oberkochen, Germany). Metrology of 3D printed field emission devices according to some embodiments was conducted using a laser scanning confocal microscope Keyence CX-X200 Series (Keyence, Osaka, Japan).

Figures 7A, 7B, 7C:
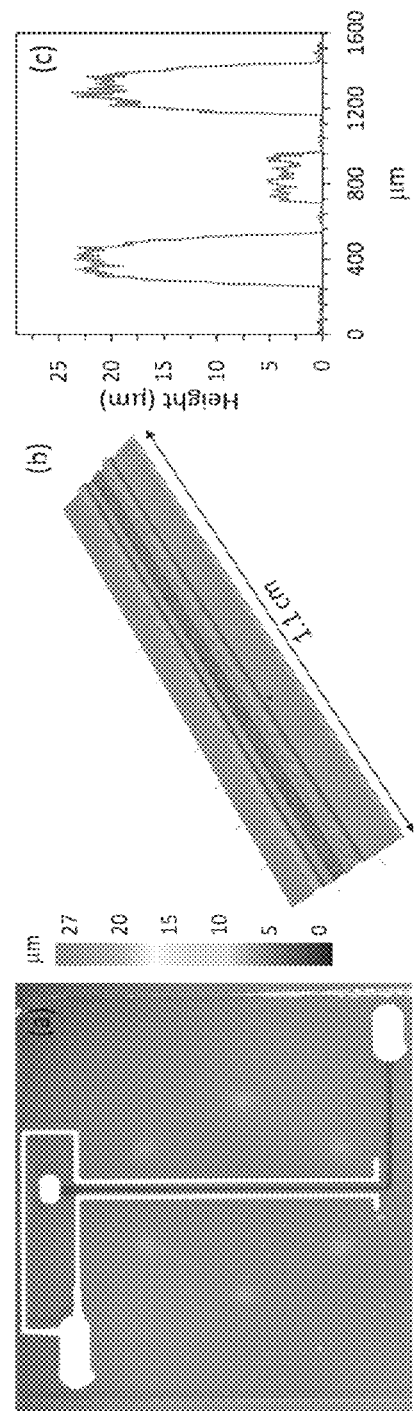
FIG. 7A is an optical image of a single bar field emission electron source device, according to some embodiments.
FIG. 7B is 3D profile of the field emission electron source device of FIG. 7A, according to some embodiments.
FIG. 7C is a height profile of the field emission electron source device of FIG. 7A captured by a laser scanning confocal microscope, according to some embodiments.
Figure 7F:
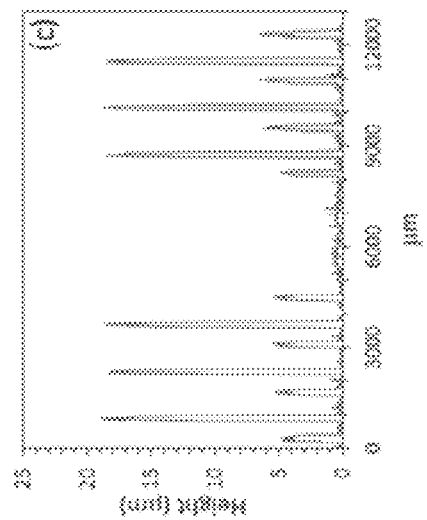
FIG. 7F is a height profile of the field emission electron source device of FIG. 7D captured by a laser scanning confocal microscope, according to some embodiments.
Figure 7E:
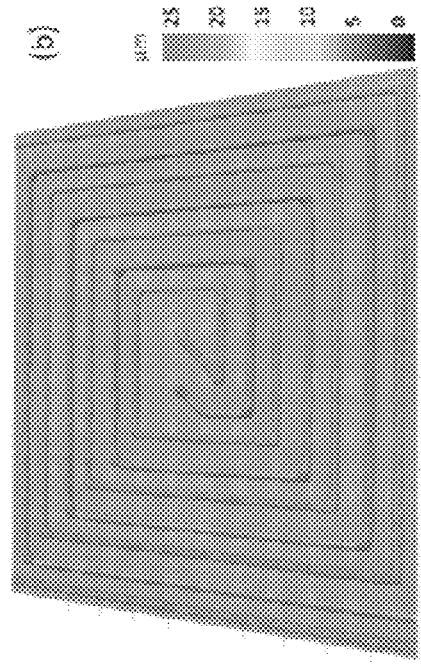
FIG. 7E is 3D profile of the field emission electron source device of FIG. 7D, according to some embodiments.
Figure 7D:
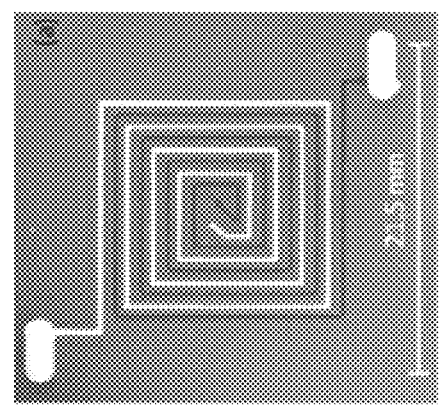
FIG. 7D is an optical image of a field emission electron source device with rectangular spirals with a theoretical gap of 550 µm, according to some embodiments.

Two example devices were manufactured according to techniques described herein. The two example devices comprised a single trace of CNT ink symmetrically surrounded by two traces of silver ink on both sides of the CNT trace (FIG. 7A; this device emulates a typical portion of spiral in a general spiral design) and a square spiral (FIG. 7D). The two example devices were characterized. The 3D metrologies of the exemplary single trace device and the exemplary square spiral device are shown in FIGS. 7B and 7E, respectively, while line scans of the cross-section of the devices are provided in FIGS. 7C and 7F, respectively. A summary of the metrology parameters is shown in Table 1, below. The traces made with the CNT ink are approximately the same width as the traces made with the Ag ink. The traces made with the CNT ink have a reduced height compared to the traces with the Ag ink. Some difference in height and width profile can be observed between the single-trace device and the square-loop design (see FIG. 7C and FIG. 7F) which may be due to the specific parameters used to print each device, for example, flow rate, trim length or other parameters. The spacing between traces may be indirectly defined by the pitch between adjacent traces and the trace width, which may be affected by flow rate, ink viscosity, and nozzle diameter.

TABLE 1

Summary of metrology of the 3D-printed field emission electron sources. Each value is the average of over 300 measurements.

| Device type | Gap between traces (µm) | Trace width Ag ink (µm) | Trace width CNT ink (µm) | Trace height Ag ink (µm) | Trace height CNT ink (µm) | Total active length CNT trace (mm) |
|---|---|---|---|---|---|---|
| Single-trace | 174.5 | 281 | 280 | 22.5 | 5 | 25 |
| Square loop | 499 | 187 | 204 | 19 | 5.5 | 135 |

Figures 8A, 8B, 8C:
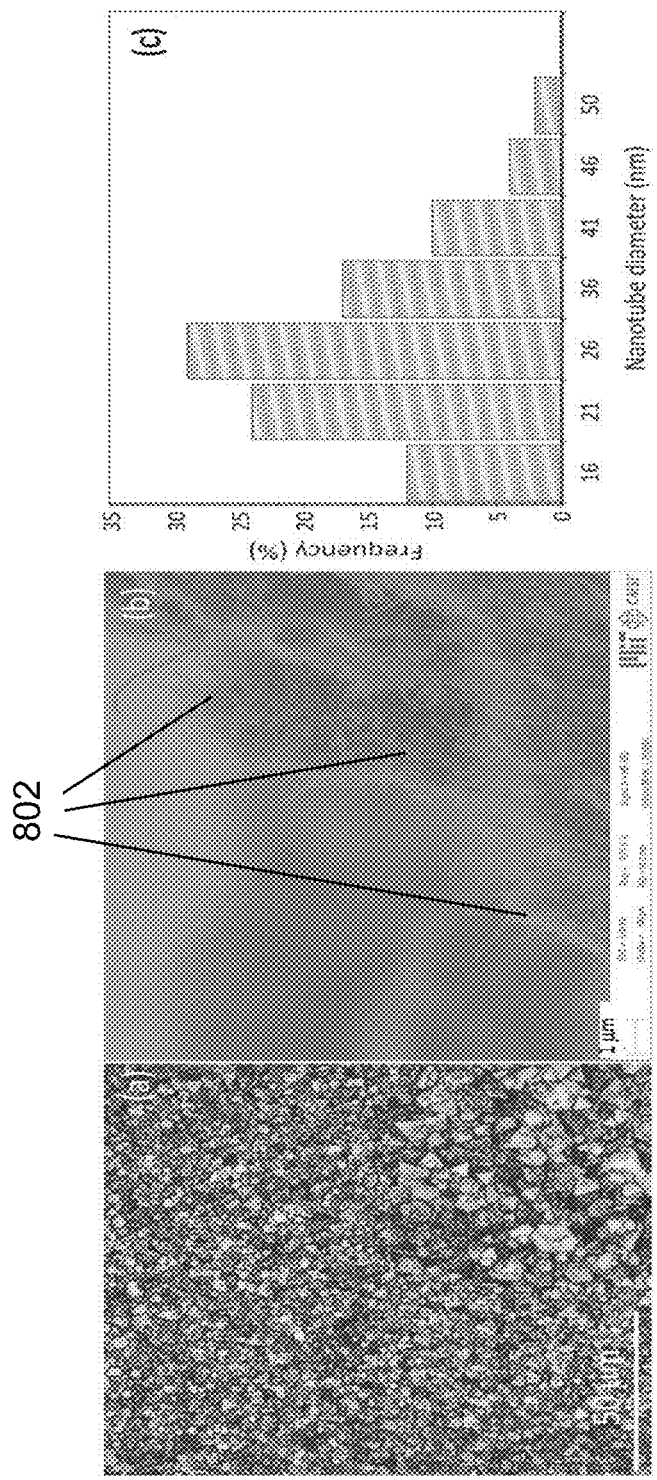
FIG. 8A is an optical image of nanoparticles in a silver ink, according to some embodiments.
FIG. 8B is an scanning electron microscope (SEM) image of CNTs protruding over the surface of a substrate, according to some embodiments.
FIG. 8C is a histogram of the diameters of the CNTs in the CNT ink, according to some embodiments.

The morphology of the surface of the Ag imprints for the two exemplary devices is shown in FIG. 8A. In the exemplary devices, the Ag ink is composed of faceted particles with size in the order of micrometres. The morphology of an exemplary CNT imprint after receiving a mechanical treatment is shown in FIG. 8B. The micrograph illustrates CNTs, including protrusions 802, protruding over the surface of the substrate, which may increase the field emission of an emission device incorporating a similar CNT imprint. In some embodiments, SEMs of imprints made of CNT ink with 2 mg/ml (0.16 wt %) MWCNT concentration that received the mechanical treatment showed fewer CNTs protruding, which may reduce the field emission of an emission device incorporating a similar CNT imprint. The histogram of the diameter distribution of the CNT powder used to manufacture the inks is shown in FIG. 8C. Diameter sizes in the range of 16-50 nm were counted, with an average diameter equal to 26 nm. It should be recognized that other sizes and distributions may be used in other embodiments, examples of which are described in the examples described herein.

Figure 9A:
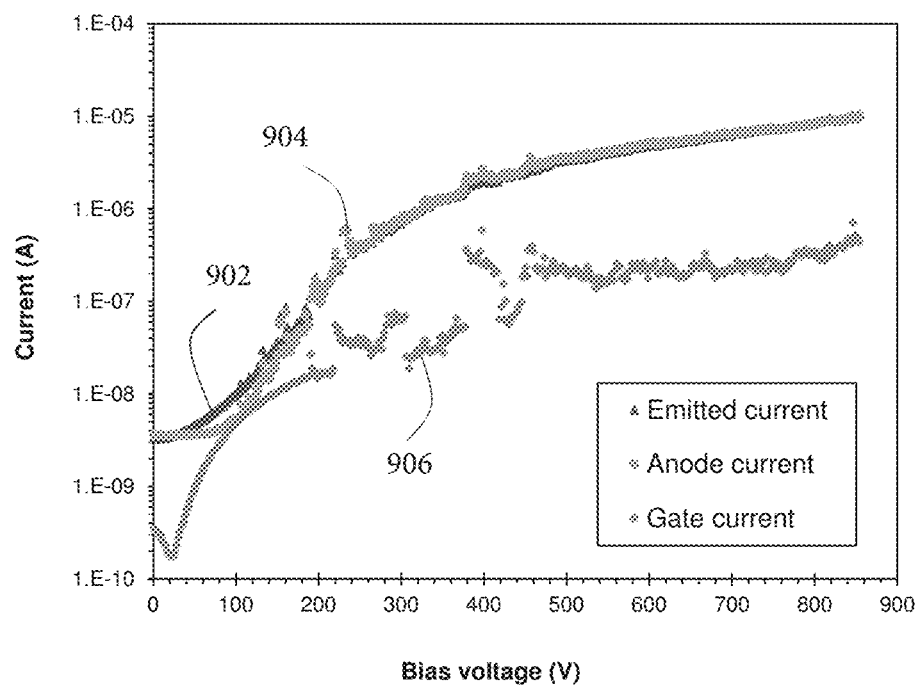
FIG. 9A is a plot of emitted current, gate current, and collected current vs. gate-to-substrate bias voltage for a single-trace electron source, according to some embodiments.
Figure 9B:
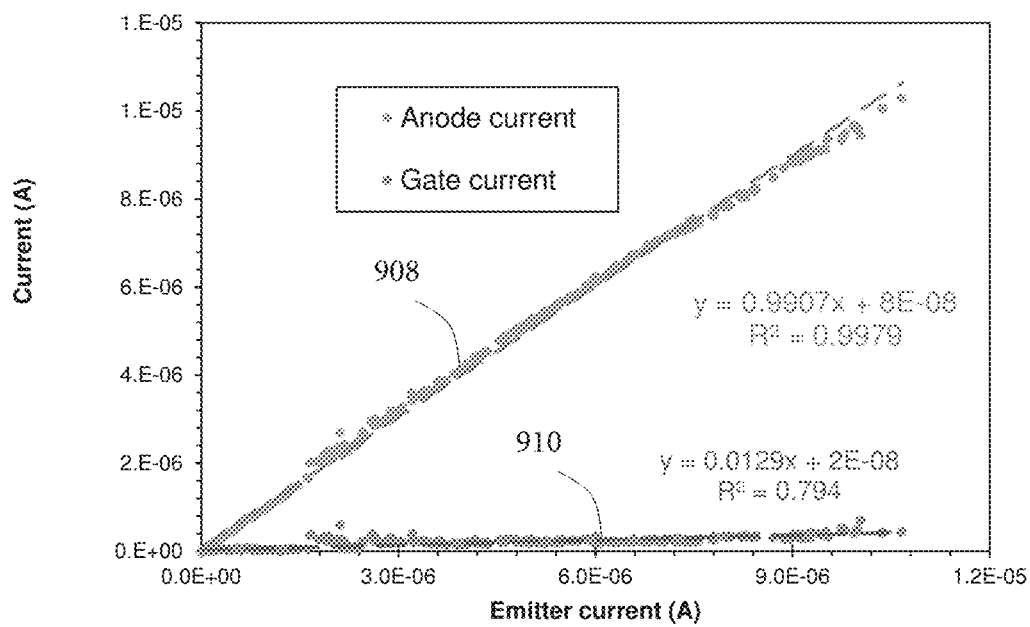
FIG. 9B is a plot of currents intercepted by the gate and collected by the anode vs emitter current for a single bar type-FED electron source, according to some embodiments.

Some aspects of the present disclosure relate to current-voltage (I-V) characteristics of emission sources formed in accordance with the techniques and materials described herein. FIG. 9A shows current-voltage (I-V) characteristics of the single-trace field emission electron sources. In FIG. 9A, plot 902 shows data for emitted current, plot 904 shows data for anode current, and plot 906 shows data for gate current. The start-up voltage of these devices is equal to ~90 V (emission current of ~5 nA). The maximum current collected by the anode is 12.0 pA (6 µA cm$^{-2}$) when the bias voltage between the emitting electrode and the gate is equal to 850 V. There is linearity between the emitted current and the anode current, as evidenced by FIG. 9B, with over 99% transmission; given that the anode is effectively hovering on top of the device, the linearity shows that the anode current is emitted by the device. In FIG. 9B, plot 908 shows data for anode current and plot 910 shows data for gate current.

Figure 10A:
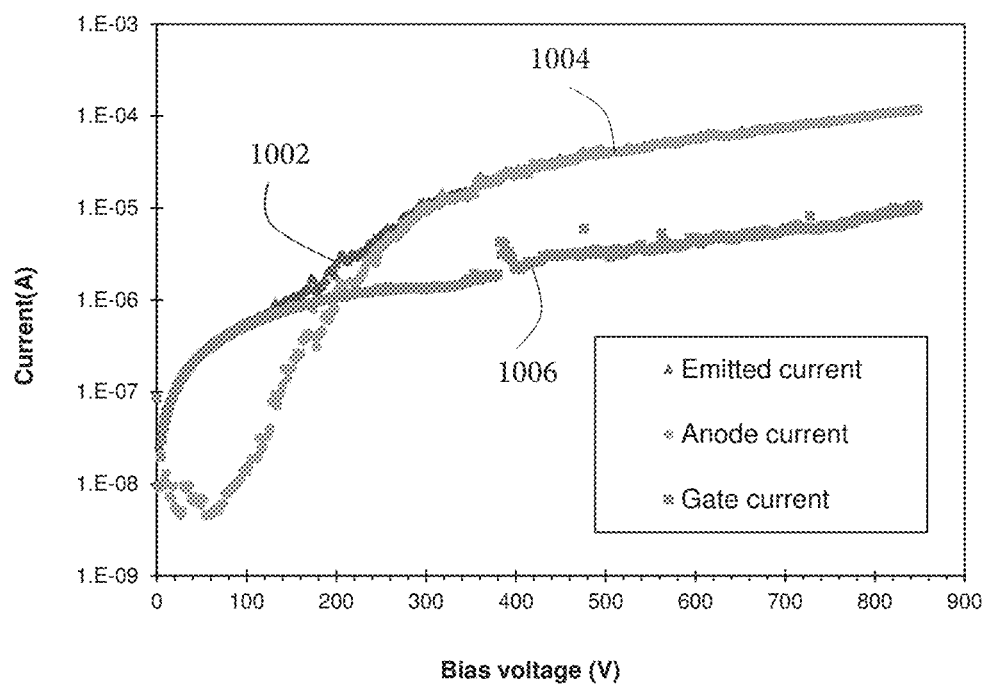
FIG. 10A a plot of field emission current, gate current, and collected current versus bias voltage for a square spiral electron source, according to some embodiments.
Figure 10B:
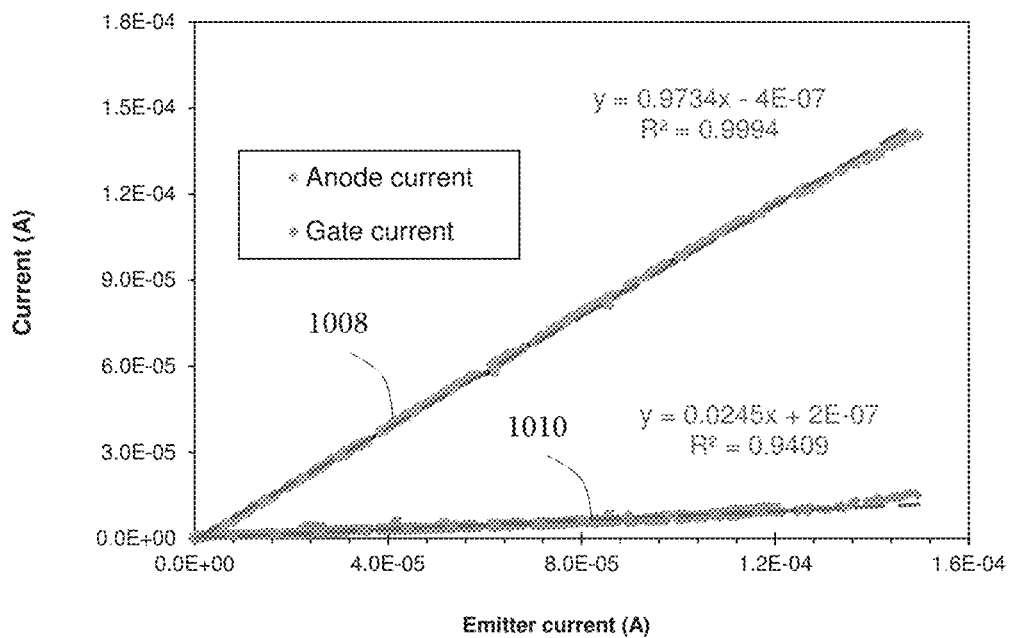
FIG. 10B is a plot of currents intercepted by the gate and collected by the anode vs emitter current for a square spiral electron source, according to some embodiments.

FIG. 10A shows current-voltage (I-V) characteristics of the square-spiral field emission electron sources. In FIG. 10A, plot 1002 shows data for emitted current, plot 1004 shows data for anode current, and plot 1006 shows a plot for gate current. The start-up voltage of these devices is equal to ~62 V (emission current of ~5 nA), while the maximum current collected by the anode is 117 µA when the bias voltage between the emitting electrode and the gate is equal to 850 V. In some embodiments, the maximum current collected by the anode may be 120 µA (60 µA cm$^{-2}$). There is linearity between the emitted current and the anode current, as evidenced by FIG. 10B, with over 97% transmission; given that the anode is effectively hovering on top of the device, the linearity shows that the anode current is emitted by the device. In FIG. 10B, plot 1008 shows data for anode current and plot 1010 shows data for gate current.

Figure 18:
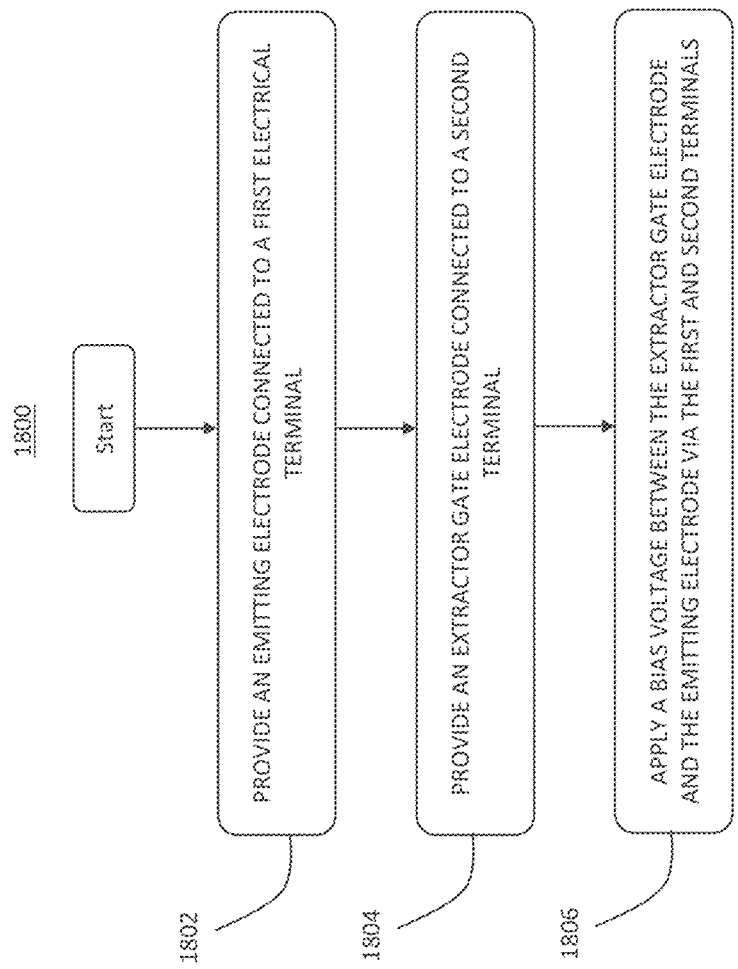
FIG. 18 illustrates an exemplary process for emitting electrons.

Aspects of the present disclosure provide methods of emitting electrons. FIG. 18 illustrates an exemplary process 1800 for emitting electrons. In act 1802, an emitting electrode connected to a first electrical terminal is provided, the emitting electrode comprising a plurality of particles with nanosharp protrusions. In act 1804, an extractor gate electrode connected to a second terminal is provided, the extractor gate comprising a metal and formed in a same plane as the emitting electrode and surrounding the emitting electrode. In act 1806, a bias voltage is applied between the extractor gate electrode and the emitting electrode via the first and second terminals.

Figure 19:
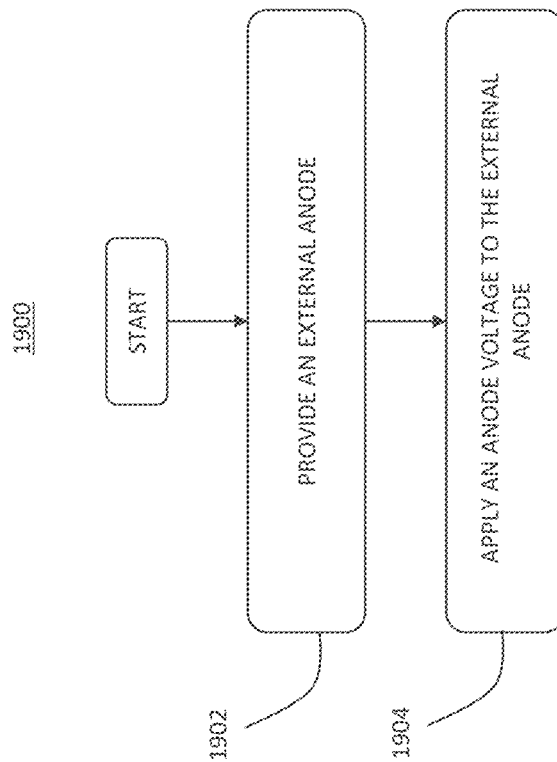
FIG. 19 illustrates an exemplary process of some acts of emitting electrodes.

In some embodiments, a method of emitting electrons comprises additional processes. FIG. 19 illustrates an exemplary process 1900 for emitting electrodes. In act 1902, an external anode is provided. In act 1904, an anode voltage is applied to the external anode.

Some aspects of the present disclosure relate to Fowler-Nordheim (FN) analysis of exemplary emission sources formed in accordance with the techniques and materials described herein, and emitting electrons in accordance with the techniques described herein.

3D-printed field emission electron sources according to some embodiments were tested in vacuum inside a grounded chamber in a triode configuration with an emitting electrode grounded, in-plane gate biased at a voltage between 0 and 850 V, and a suspended anode (for example, a flat cylinder with rounded corners) biased at +1300 V. All three voltages were supplied by calibrated source-measuring units Keithley 2650 (Tektronix, Beaverton Oreg., USA). The vacuum was maintained using a dry rough pump and a turbomolecular pump, maintaining the pressure inside the chamber below 2.5×10−7 Torr during the experiments.

Figure 11A:
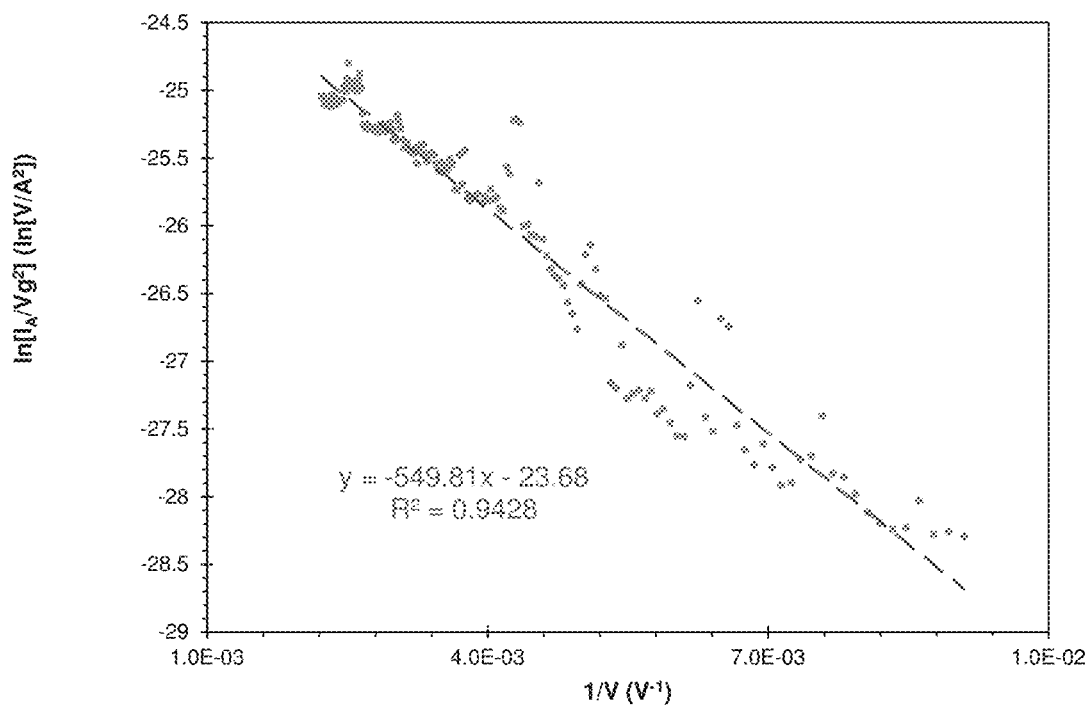
FIG. 11A is a Fowler-Nordheim (FN) plot of the anode current for a single-imprint device, according to some embodiments.
Figure 11B:
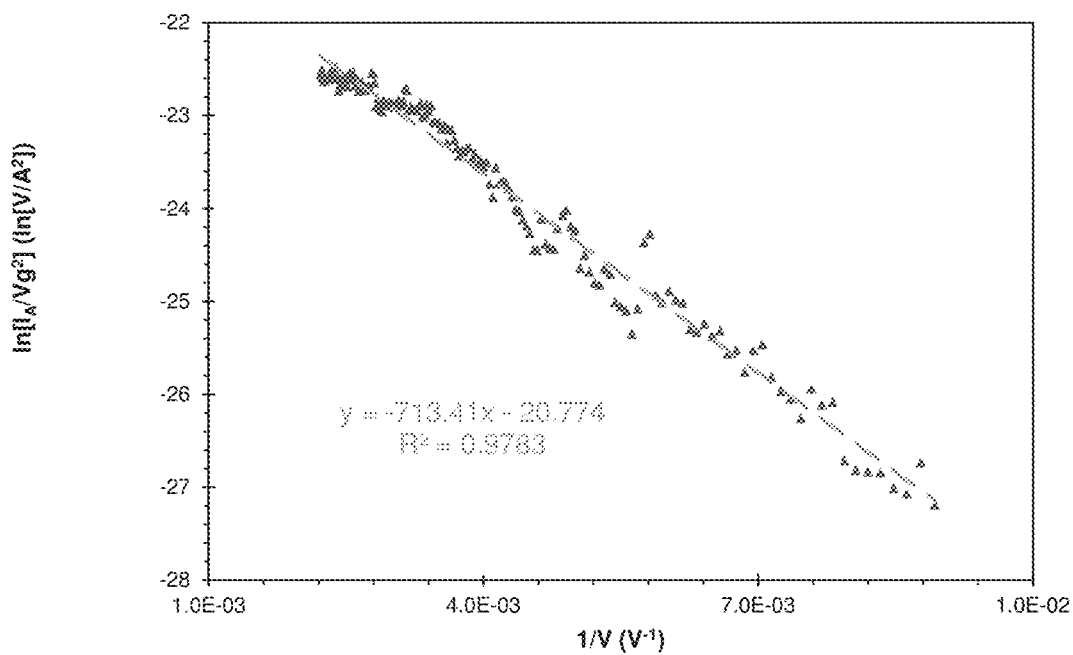
FIG. 11B is a FN plot of the anode current for a square spiral device, according to some embodiments.

The field emission characteristic can be described using the Fowler-Nordheim (FN) equation:

$$\ln(I/V^2) \propto \frac{-6.53 \times 10^7 \phi^{1.5}}{\beta} \frac{1}{V}, \tag{1}$$

or in some embodiments the FN equation $$I \propto \beta^2 V^2 \exp\left(\frac{-6.49 \times 10^7 \phi^{1.5}}{\beta V}\right), \tag{2}$$

where I is the electron current produced by an emitter biased at a voltage V with respect to the gate electrode, β, in cm$^{-1}$, and ϕ, in eV, are the field enhancement factor of the field emitter and the work function of the emitting surface, respectively. Thus, a plot of ln(I/V$^2$) vs. I/V should describe a straight line if the current is field emitted. FIGS. 11A-11B shows the FN plot of the transmitted current (anode current) for the data plotted in FIGS. 9A-9B and FIGS. 10A-10B, respectively. The goodness of fit of the least-squares fittings in FIGS. 11A-11B suggest that the anode current, and by extension most of the emitted current, are the result of barrier tunneling of electrons due to the high electric field. The slopes of the two plots are relatively similar, which may be expected because for a CNT forest with a proximal gate the field factor is, to first order, equal to the inverse of the tip radius of the tips, and both emitting electrodes were made with the same CNT ink. From the slope of the least-squares fitting of FIG. 11A, a field factor equal to 1.25×10$^6$ cm$^{-1}$ is estimated, which corresponds to a MWCNT tip diameter equal to 16.1 nm assuming a work function of 4.81 eV for CNTs; similarly, from the slope of the least-squares fitting of FIG. 11B, a field factor equal to 9.60×10$^5$ cm$^{-1}$ is estimated, which corresponds to a tip diameter equal to 20.8 nm. These values fall within the distribution of tip diameters previously estimated (FIG. 8C), and are towards the lower end, which may be expected because sharper tips emit before wider tips.

Figure 12:
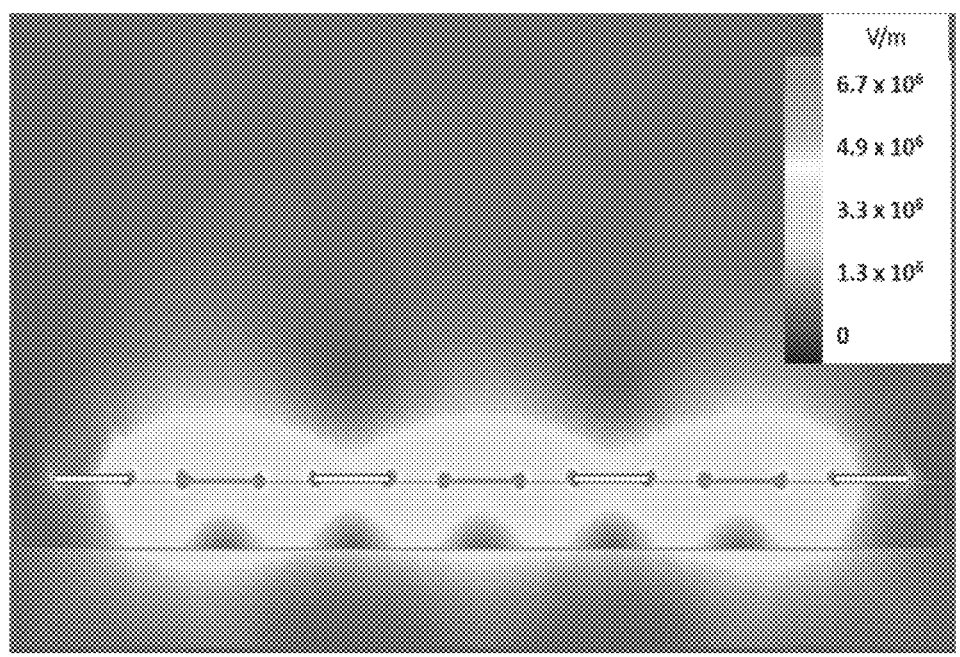
FIG. 12 is a 2D electrostatic simulation of the square spiral electron source, according to some embodiments.

The cross-section of the square-loop electron source was simulated using Maxwell SV to assess the field enhancing effect of the electrode structure. In some embodiments, the simulation results indicate that the electrodes by themselves are not able to create field emission at bias voltages below ~600 kV (FIG. 12). In some embodiments, the simulation predicts that surface electric fields as high as 6.7×10$^6$Vm$^{-1}$ would be generated on the edges of the emitting electrode when a gate bias voltage equal to 1100 V is applied between the gate and the emitting electrode (FIG. 12). Simulation results may indicate that the electrodes alone are not able to trigger field emission at bias voltages below ~500 kV. However, having released MWCNTs can allow emission at a much smaller (<100 V) bias voltage. The ratio of the emitted current by the single-trace device to the emitted current by the square-loop device is within a factor of two of the ratio of their total length of active CNT imprint (for example, an imprint surrounded at least on one side by Ag imprint), suggesting a uniform spread of the released CNTs along the emitting electrode, and suggesting that the sharpness of the MWCNTs may contribute to the field enhancement.

Given the performance and dimensions of the fully-printed field emission electron sources, the inventors have recognized and appreciated at three applications for which the field emission electrons sources could be used: compact mass spectrometry, pico and nanosatellite electric propulsion, and compact x-ray generation.

First, the devices may be used in a miniaturized mass spectrometer. Mass spectrometers generate mass spectra data by sorting out ions in vacuum using electrical and/or magnetic fields; the ions can be created in various ways at external (ambient pressure) or internal (vacuum) conditions. For internal ion generation, in some embodiments, one method is electron impact ionization, in which neutral gas molecules are ionized via fragmentation using a stream of energetic electrons. The devices described herein may be used as an electron source in an electron impact gas ionizer; benefits of using CNT electron sources includes compatibility with low-vacuum (10 mTorr level) operation, which the inventors have recognized and appreciated lines up well with relaxing the vacuum requirements in this kind of compact instrument. The electron current used in a mass spectrometer with an electron impact ionizer is related to the noise floor of the detector, the transmission efficiency of the mass filter, and the ionization efficiency of the ionizer (for example, how many ions are generated per electron emitted). The noise floor of a typical mass spectrometer detector may be on the order of 1 pA. In some mass filters (for example, a quadrupole), a few percent of the ions created by the ionizer may be transmitted. The ionization efficiency is linearly related to pressure, and at 20 mTorr may be about 19%. Therefore, for a typical lower bound of electron impact ionization pressure (~1 µTorr), the electron current required may be on the order of 10 µA.

Another example application of the electron sources described herein is for use as part of a handheld x-ray source for applications such as materials analysis via fluorescent spectroscopy and radiography. The bias voltages required to activate the field emission electron source may be over an order of magnitude smaller than the bias voltage required to produce x-rays via bremsstrahlung, and the currents may be of the right order of magnitude. For creating x-ray images, the inventors have recognized and appreciated that some important factors to consider include the number of photons created per exposure; the number of photons being proportional to the electrons supplied during the exposure, that is, the electron current times the exposure time. Accordingly, the inventors have recognized and appreciated that a cathode with significantly less current may generate the same images by increasing the exposure time. In some embodiments, the current emitted by the devices may be increased by (i) making the emitting area larger, (ii) making the imprint patterns finer and spaced tighter, and (iii) using thinner CNTs.

Another example application of the electron sources described herein is for use as neutralizers in pico and nanosatellite electric propulsion. For in-orbit maneuvers, electric propulsion may be preferred over chemical propulsion because it may more efficiently use the propellant (the speed of the jet in a chemical rocket is limited by the amount of energy generated by the chemical reaction, while the speed of the beam in an electric rocket can be arbitrarily increased using a suitable bias voltage). Electric thrusters may emit a positive beam to provide thrust to the spacecraft, hence requiring a source of electrons to keep overall charge neutrality; however, in a nanosatellite, the standard hollow cathode technology may not be attractive because it may consume propellant at a flow rate comparable (or even larger) than the propellant used to produce thrust. Unlike metal-based field emission sources, CNT cathodes can withstand the oxygen traces found at Low-Earth Orbit (LEO), hence becoming practical in many potential nanosatellite applications including Earth surveillance, communications, and weather monitoring. The devices described herein may be adequate to neutralize the beam in certain missions, for example, in the Laser Interferometer Space Antenna (LISA) mission. In other cases, a device with an order of magnitude larger area that produces an order or magnitude more current may be employed, which is compatible with the capabilities of DIW and with the dimensions of a picosatellite (1-3 cubic liters, 600 $cm^2$-1400 $cm^2$ surface area). In some embodiments, the current emitted by the devices may be increased by making finer and tighter imprint patterns and using thinner CNTs.

Aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application provide a fully additively manufactured CNT field emission electron sources with in-plane gate planar-triode structures. The devices were made via DIW printing, and may comprise a flat dielectric substrate with a trace made of a CNT ink as emitting electrode, symmetrically surrounded on both sides by a trace made of Ag microparticle ink as in-plane extractor gate. Additional aspects of the present application include a conductive ink for use in DIW printing and a method for manufacturing the ink. The CNT ink with 20 mg/ml (0.82 wt %) MWCNT concentration has an electrical resistivity equal to 0.77 Ω·cm and showed a great profusion of released nanotubes on the surface (after applying a mechanical treatment), which resulted in significant electron field emission. An exemplary device formed in accordance with the techniques described herein displayed electrical characteristics such as a start-up voltage as small as ~100 V and emission currents as high as 143 mA (143 mA·$cm^2$) with high (~90% gate transmission). An exemplary device formed in accordance with the techniques described herein displayed electrical characteristics such as a start-up voltage as small as 62V and emission currents as high as 120 µA (60 µAcm−2) with high (>97%) gate transmission. An exemplary 3D-printed field emission source formed in accordance with the techniques described herein and disposed in a vacuum displayed, in a triode configuration (for example, using an external anode electrode), electrical characteristics such as a turn-on bias voltage equal to ~100V and 27.8 µA electron current emission @ 500 V with >98% gate transmission. 3D printed cathodes formed in accordance with the techniques described herein may be applied to portable mass spectrometry, handheld X-ray generation, and nanosatellite electric propulsion.

Some embodiments relate to CNT ink fabrication. The CNT ink may be composed of a solvent (for example, DMF), a polymeric binder (for example, EC, which is a material that provides cohesion to the ink), and a filler (for example, MWCNTs, which are the material that gives the electrical conductivity to the ink). To manufacture the CNT ink, MWCNT powder may be dispersed in DMF using an ultrasonic homogenizer and a stirrer. After that, the EC powder may be added to the solution (in one exemplary embodiment, 21% by weight), stirring until all the material was dissolved into the solution. Finally, the resulting ink may be poured into an empty cartridge syringe and stored, for example, at 5-10° C., until needed for printing. In various embodiments, the CNT ink may comprise various CNT concentrations. For example, in one embodiment, the CNT ink has a CNT concentration of 2 mg of MWCNTs per ml of DMF (0.16 wt %). In another embodiment, the CNT ink has a CNT concentration of 20 mg of MWCNTs per ml of DMF (0.82 wt %). In some embodiments, an ink formulation with the higher concentration of CNTs yields imprints that can field emit. Devices made with such ink are characterized herein.

While the above choices of parameters and characteristics are used in some embodiments, other embodiments may use other parameters and characteristics.

Figure 3:
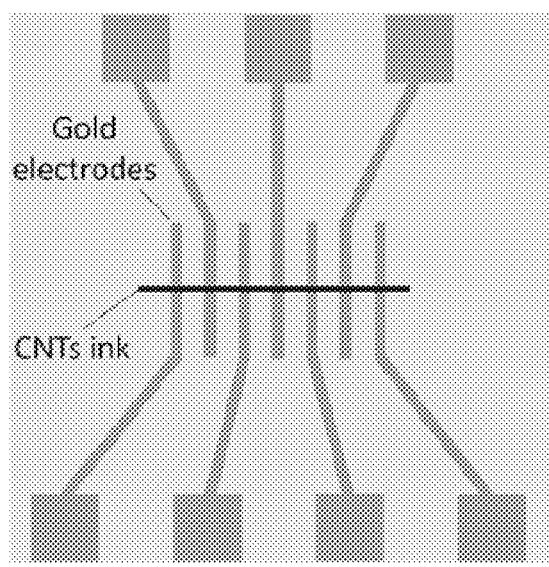
FIG. 3 is a schematic representation of gold electrodes used to measure the electrical resistance of the CNT ink, according to some embodiments.

The electrical resistivity of the CNT and Ag inks provided in accordance with some embodiments was characterized using printed straight lines with constant cross-section on glass chips that had patterned gold-sputtered fingers (FIG. 3). Resistivity measurements were conducted with a multimeter Fluke 8846A (Everett Mass., USA).

Thermogravimetrical analysis (TGA) of the CNT ink was carried out in a Discovery TGA (TA Instruments, New Castle Del., USA), with a balance precision of 0.0001 mg. For this analysis, the samples were heated to 800° C. at a rate of 20° C.·min$^{-1}$ under nitrogen atmosphere. The inks' viscosity was measured at 1-100 s$^{-1}$ shear rates using an Advance Rheometer AR2000 (TA Instruments, New Castle Del., USA).

Figure 4A:
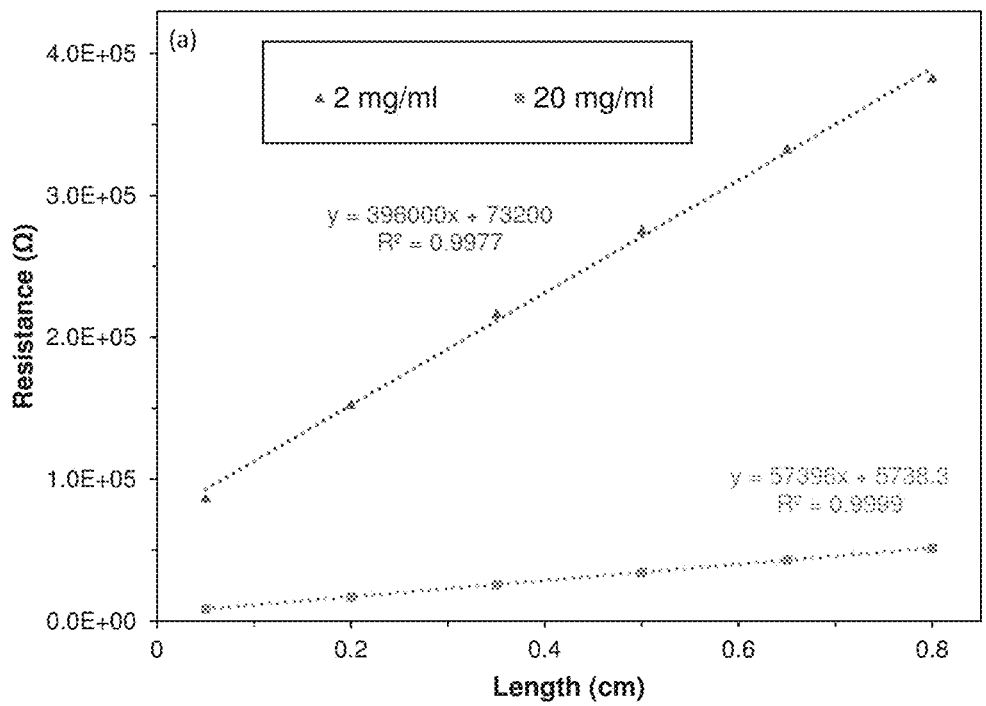
FIG. 4A is a plot of the electrical resistance of developed CNT ink, according to some embodiments.
Figure 4B:
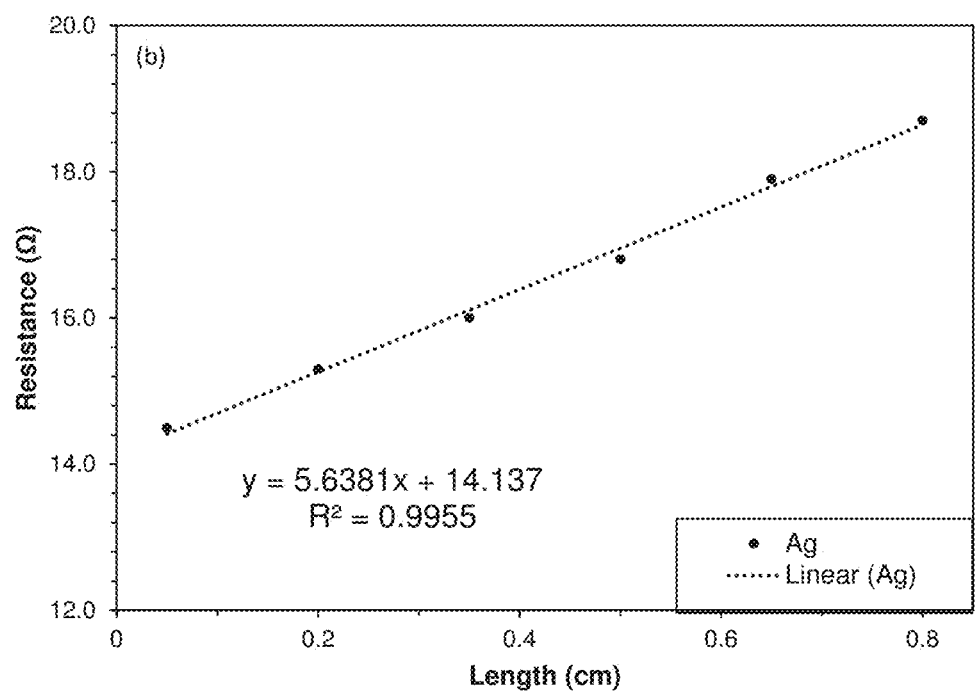
FIG. 4B is a plot of the electrical resistance of developed Voltera flexible Ag ink, according to some embodiments.

An exemplary electrical characterization of Ag ink and CNT inks provided in accordance with some embodiments is shown in FIG. 4A and FIG. 4B. In the exemplary characterization, the width and thickness of the imprint made of ink with 2 mg/ml (0.16 wt %) MWCNT concentration are equal to 548.8 µm±90.9 µm and 702.3 nm±90.0 nm, respectively, while the width and thickness of the imprint made of ink with 20 mg/ml (0.82 wt %) MWCNT concentration are equal to 297.5 µm±18.3 µm and 4.6 µm±0.1 µm, respectively. In the exemplary characterization, a tenfold increase in the concentration of CNTs, while keeping the binder concentration constant, resulted in a twofold decrease of the imprint width and a sevenfold increase in the thickness of the imprint.

The width and thickness of the exemplary imprint made of Ag ink are equal to 154.3 µm±11.4 µm and 10.4 µm±0.3 µm, respectively. A least-squares fittings of the data in FIG. 4A and FIG. 4B demonstrate linearity between the length of the imprint and its electrical resistance. The resistivity was calculated using the equation $$R = 2R_o + \frac{\rho}{A} x \qquad (3)$$

where R is the electrical resistance of the imprint, $R_o$ is the contact resistance, ρ is the electrical resistivity, and A and x are the cross-sectional area of the imprint and the length of the imprint, respectively. Given that the electrical resistivity of gold and silver are very high, the data from the silver imprints was corrected for the voltage drop taking place across the interdigitated fingers. In the exemplary characterization, the contact resistance and resistivity of the ink with 2 mg/ml (0.16 wt %) MWCNT concentration (36.6 kΩ) is an order of magnitude larger than the corresponding value for the ink with 20 mg/ml (0.82 wt %) MWCNT concentration (2.9 kΩ). The electrical resistivity increased twofold (1.53 Ω·cm vs. 0.78 Ω·cm). The resistivity values of the CNT inks are comparable to values from single-crystal doped Si. The electrical resistivity of the silver ink is orders of magnitude smaller than the resistivity values of the CNT inks (90.4 µΩ·cm), although is almost two orders of magnitude larger than the bulk value of Ag (1.59 µΩ·cm). The contact resistance of the imprint made of Ag ink is also orders of magnitude smaller than the values obtained with imprints made of CNT ink (7.0Ω).

Figure 5A:
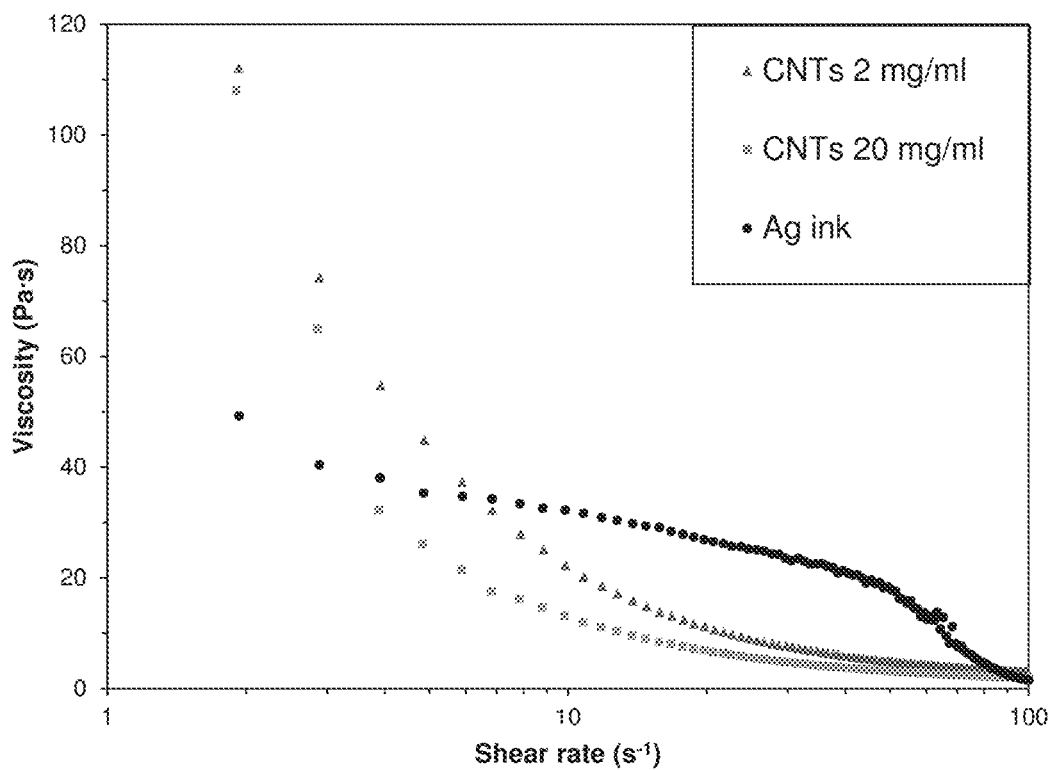
FIG. 5A is a plot of the viscosity versus shear rate for the various inks at room temperature, according to some embodiments.

The inventors have recognized and appreciated that the viscosity of a DIW-printable ink may determine the reliability of a 3D printed field emission device formed using that ink and the reliability of the method of manufacturing the 3D printed field emission device. For example, if the viscosity of the ink is too small, the ink may spill over the substrate instead of defining a continuous, constant imprint with width similar to the width of the nozzle; if the viscosity of the ink is too large, stable flow through the nozzle may not be achievable and the piston mechanism may jam due to large hydraulic resistance opposing its movement. In some embodiments, the viscosity of a CNT ink can be modulated by varying the polymeric binder (for example, the EC) or the filler (for example, MWCNTs) concentration. FIG. 5A shows the viscosity of the inks as a function of the shear rate. In the exemplary characterization, the data demonstrate shear thinning behavior. In the exemplary characterization, the viscosity of the ink with 2 mg/ml (0.16 wt %) MWCNT concentration varies between 108 Pa·s and 2 Pa·s, while the viscosity of the ink with 20 mg/ml (0.82 wt %) MWCNT concentration varies between 112 Pa·s and 2 Pa·s, or in some embodiments, between 112 Pa·s and 3 Pa·s. The viscosity of the ink with 20 mg/ml (0.82 wt %) MWCNT concentration is about twice the viscosity of the ink with 2 mg/ml (0.16 wt %) MWCNT because the concentration of binder is the same. For shear rates above 5 Hz, the viscosity of the ink with 20 mg/ml (0.82 wt %) MWCNT concentration is about twice the viscosity of the ink with 2 mg/ml (0.16 wt %) MWCNT. The viscosity of the Ag ink has the same order of magnitude of the viscosity of the CNT inks, varying between 49 Pa·s and 1.5 Pa·s, but is larger than the viscosity of the CNT inks in the 10 Pa·s-90 Pa·s range, and is larger than the viscosity of the CNT inks for shear rates between 10 and 70 Hz.

Figure 5B:
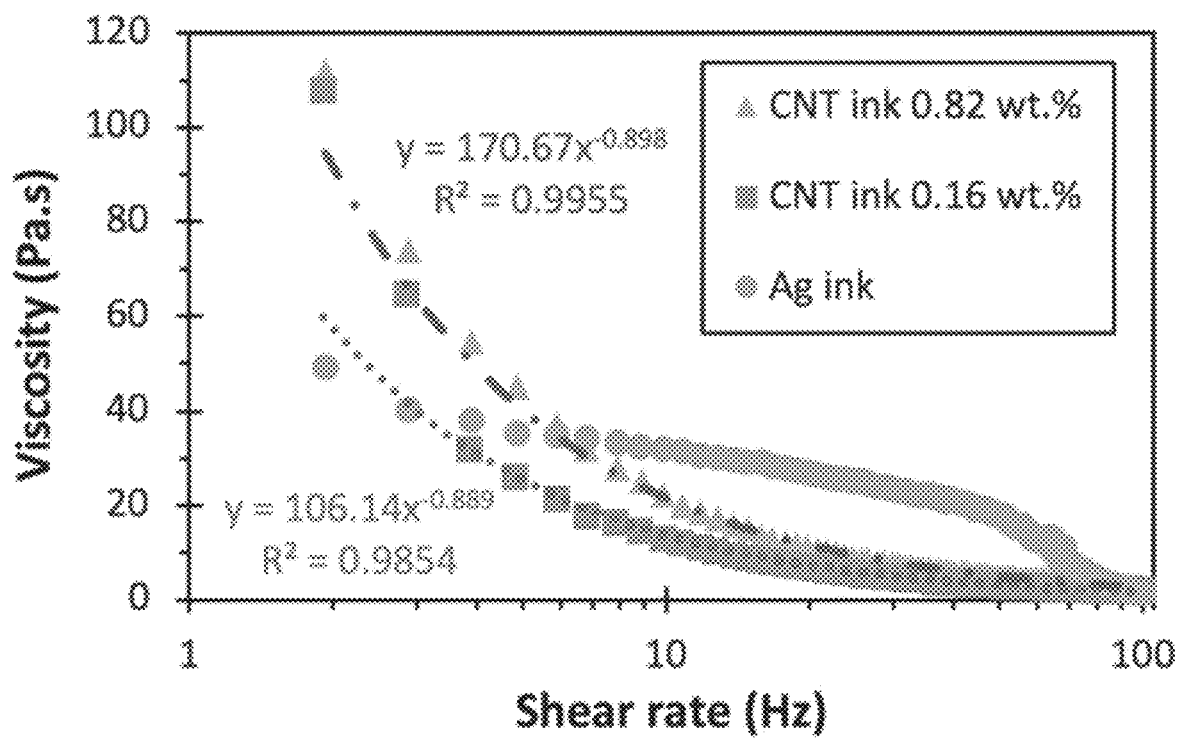
FIG. 5B is a plot of the viscosity versus shear rate for the various inks at room temperature with least-square fittings, according to some embodiments.

In a non-Newtonian, power-law fluid, the shear stress T is proportional to the n-power of the shear rate $$\tau = K\left(\frac{du}{dr}\right)^n = \left[K\left(\frac{du}{dr}\right)^{n-1}\right]\left(\frac{du}{dr}\right), \qquad (4)$$

where K is the flow consistency index (in Pa s$^n$), n is the flow behavior index (dimensionless), u is the velocity of the fluid, r is the spatial coordinate across which the flow field changes (for example, the radial coordinate in the case of a long, circular pipe like the printer's nozzle); the expression within square brackets is the effective viscosity. Therefore, for both CNT inks the flow behavior index is about 0.1 (see least-square fittings of FIG. 5B). A rough estimate of the average shear rate is given by $$\left(\frac{du}{dr}\right) \sim \frac{U}{R}, \tag{5}$$

where U is the average speed of the fluid (also the rastering speed of the nozzle) and R is the inner radius of the nozzle. The typical speed of the nozzle during printing is ~4 mm s$^{-1}$; therefore, the average shear stress of the Ag ink during printing is 80 Hz (50 μm inner nozzle radius), while the average shear stress of the CNT inks during printing is 36 Hz (112.5 μm inner nozzle radius). Consequently, the average effective viscosity during printing is equal to ~4.6 Pa s for the Ag ink, ~4.1 Pa s for the 2 mg/ml (0.16 wt %) CNT ink, and 6.5 Pa s for the 20 mg/ml (0.82 wt %) CNT ink.

Figure 6:
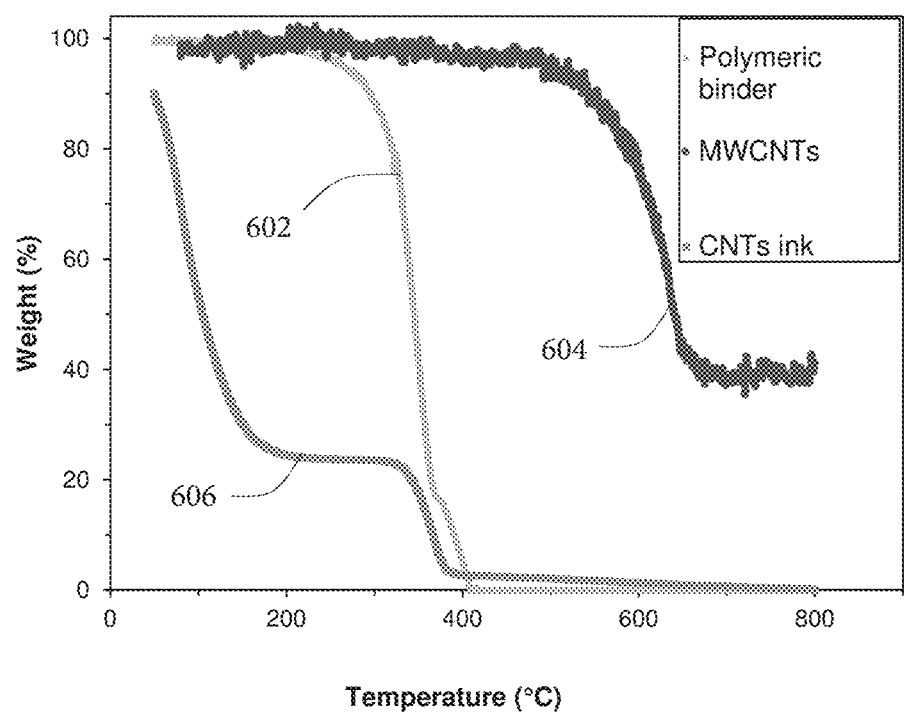
FIG. 6. is a plot of thermogravimetrical analysis (TGA) thermograms of CNTs ink, polymeric binder and multi-wall CNT (MWCNT) powder, according to some embodiments.

In some embodiments, the binder and solvent in a CNT ink serve as a transport medium in which the CNTs travel while the ink is extruded over the substrate. However, the binder and solvent may be poor electrical conductors that, contrary to the CNTs, exhibit high electrical conductivity. In some embodiments, the binder and solvent may be removed from the imprint after printing. In order to find the decomposition temperature of a polymeric binder and solvent according to some embodiments, a TGA analysis was performed (FIG. 6). In FIG. 6, plot 602 shows data for the polymeric binder, plot 604 shows data for MWCNTs, and plot 606 shows data for the CNT ink. The data show that that the polymeric binder decomposition temperature may be about 400° C., while the MWCNTs may start to degrade at around 500° C. The removal of DMF solvent may start at 153° C., as shown for the CNT ink characteristic. In some embodiments, an annealing temperature of the CNT imprints can be set between 400° C. and 500° C. In some embodiments, using an annealing temperature between 400° C. and 500° C. may ensure that the binder and solvent are removed but the MWCNTs are not damaged. It should be understood that the above temperatures are only examples based on the particular formulation used. Other inks with different filler and/or different solvent and/or different polymeric binder may have different decomposition temperatures, resulting in different bake temperatures during the method of manufacturing the device.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure. For example, the folded photonic processing system may be implemented with the phase stabilizing capabilities described above.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately", "substantially," and "about" may be used to mean within ±20% of a target value in some embodiments, within ±10% of a target value in some embodiments, within ±5% of a target value in some embodiments, and yet within ±2% of a target value in some embodiments. The terms "approximately", "substantially", and "about" may include the target value.

What is claimed is:

1. A field emission electron source comprising: an emitting electrode comprising a plurality of particles with nanosharp protrusions; and an extractor gate electrode comprising a metal, the extractor gate electrode formed in a same plane as the emitting electrode and surrounding the emitting electrode.

2. The field emission electron source of claim 1, wherein the metal comprises at least one metal selected from the group consisting of silver, gold, and aluminum.

3. The field emission electron source of claim 1, wherein the plurality of particles with nanosharp protrusions comprise at least one of nanotubes or nanowires.

4. The field emission electron source of claim 1, wherein the plurality of particles with nanosharp protrusions comprise at least one particle selected from the group consisting of carbon nanotubes, zinc oxide nanowires, and silicon nanowires.

5. The field emission electron source of claim 1, wherein the emitting electrode is parallel to the extractor gate electrode along at least a portion of the emitting electrode.

6. The field emission electron source of claim 1, wherein the emitting electrode is equidistant from two different portions of the extractor gate electrode along an entire length of the emitting electrode.

7. The field emission electron source of claim 6, wherein a distance from the emitting electrode to each of the two different portions of the extractor gate electrode is between 100 nm and 1,000 μm.

8. The field emission electron source of claim 1, wherein the emitting electrode has a first substantially uniform trace width and the extractor gate electrode has a second substantially uniform trace width.

9. The field emission electron source of claim 8, wherein: the first substantially uniform trace width is between 1 μm and 500 μm; and the second substantially uniform trace width is between 1 μm and 500 μm.

10. The field emission electron source of claim 1, wherein the emitting electrode has a shape of a first spiral and the extractor gate electrode has a shape of a second spiral, wherein the first and second spiral are interleaved.

11. A mass spectroscopy device comprising a field emission electron source of claim 1.

12. A x-ray source device comprising a field emission electron source of claim 1.

13. A neutralizer for electric space propulsion comprising a field emission electron source of claim 1.

* * * * *